US010652402B2

United States Patent
Nakajima

(10) Patent No.: US 10,652,402 B2
(45) Date of Patent: May 12, 2020

(54) IMAGE READING APPARATUS WITH ABNORMALITY NOTIFICATION FOR DRIVING UNIT AND FOR POSITION SENSOR

(71) Applicant: CANON KABUSHIKI KAISHA, Tokyo (JP)

(72) Inventor: Fumika Nakajima, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/182,454

(22) Filed: Nov. 6, 2018

(65) Prior Publication Data

US 2019/0158679 A1    May 23, 2019

(30) Foreign Application Priority Data

Nov. 20, 2017    (JP) ................. 2017-222735

(51) Int. Cl.
*H04N 1/00*    (2006.01)
*H04N 1/12*    (2006.01)

(52) U.S. Cl.
CPC ..... *H04N 1/00037* (2013.01); *H04N 1/00013* (2013.01); *H04N 1/00042* (2013.01); *H04N 1/00084* (2013.01); *H04N 1/00652* (2013.01); *H04N 1/1235* (2013.01)

(58) Field of Classification Search
CPC ................................................ H04N 1/00652
See application file for complete search history.

(56) References Cited

U.S. PATENT DOCUMENTS 5,109,288 A * 4/1992 Moriya ................ H04N 1/0473
358/497
2015/0281516 A1* 10/2015 Matsui ..................... H04N 1/04
358/474

FOREIGN PATENT DOCUMENTS

JP    2014-240141    12/2014

OTHER PUBLICATIONS

Machine translation of JP 2014-240141.*

* cited by examiner

*Primary Examiner* — Lennin R RodriguezGonzalez
(74) *Attorney, Agent, or Firm* — Venable LLP

(57) ABSTRACT

An image reading apparatus comprises a driving control part which detects a driving abnormality of a motor which drives a moving unit configured to be movable. Further, the image reading apparatus comprises a HP sensor an output of which changes in accordance with a position of the moving unit, and a CPU(A) which moves the moving unit by controlling operation of the motor based on the output change of the HP sensor. The CPU(A) determines that a driving abnormality occurs in a case where the driving control part detects an abnormality while moving the back surface glass unit. The CPU(A) determines that a position detection abnormality occurs if the output of the HP sensor does not change even when the moving unit is moved by a predetermined distance (ON reference moving amount and OFF reference moving amount) or more in a state where no abnormality is detected by the driving control part.

7 Claims, 20 Drawing Sheets

FIG. 21A
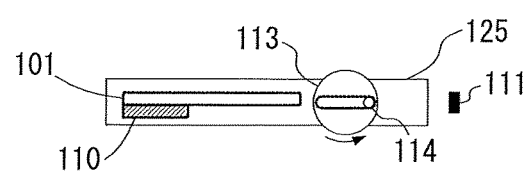
FIG. 21C
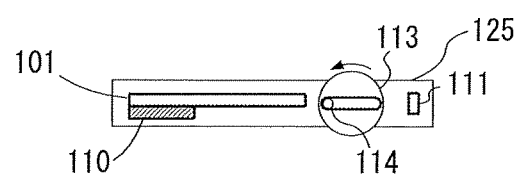
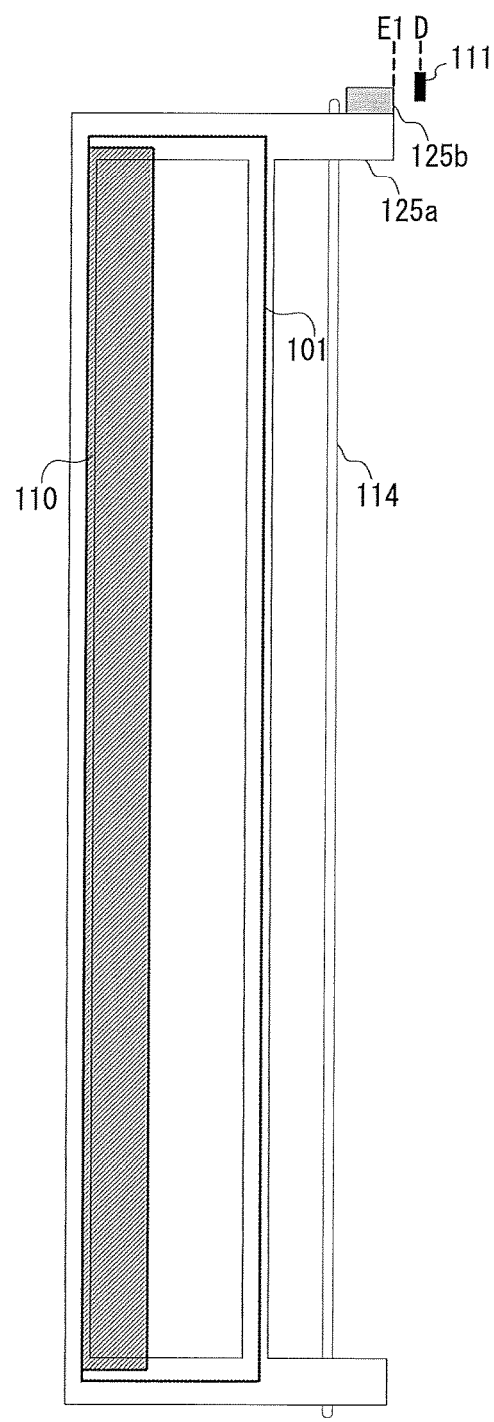
FIG. 21B
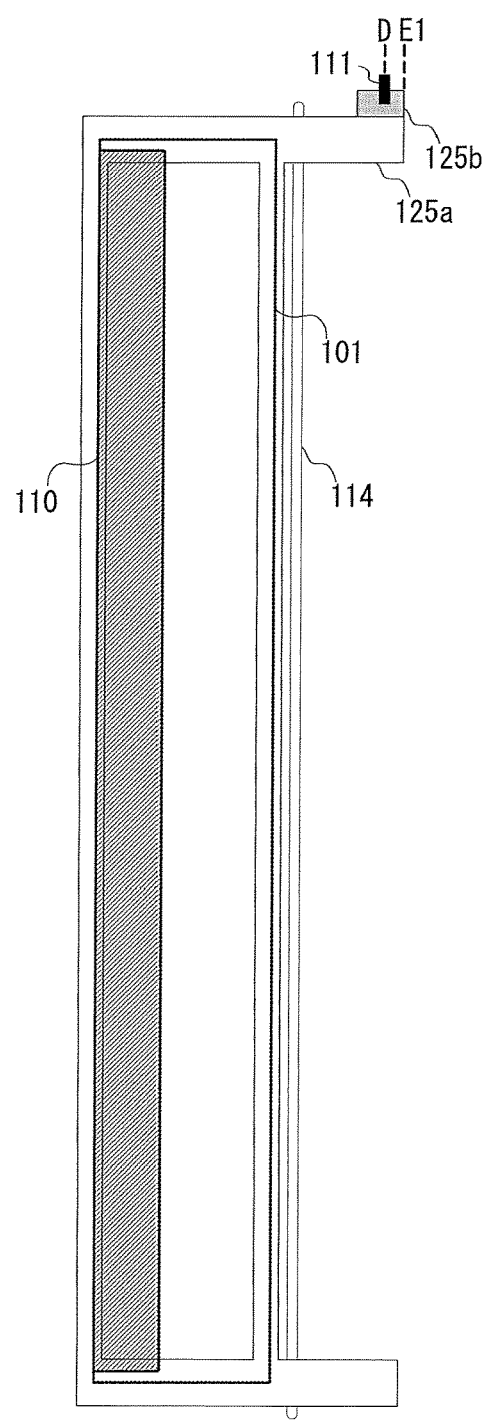
FIG. 21D

IMAGE READING APPARATUS WITH ABNORMALITY NOTIFICATION FOR DRIVING UNIT AND FOR POSITION SENSOR

BACKGROUND OF THE INVENTION

Field of the Invention

The present disclosure relates to a technology for determining a type of an abnormality generated in an image reading apparatus.

Description of the Related Art

In a copying machine, various peripheral devices connected to the copying machine and the like, a motor is used as a driving source to move a driven unit. For example, an image forming apparatus such as a copying machine, a facsimile machine and the like comprises an image reading apparatus such as a scanner which optically reads an image of an original to obtain image data. These image reading apparatuses often comprise an auto document feeder (hereinafter, referred to as ADF) to read a plurality of originals by one operation in addition to reading the original placed on a platen glass.

Moreover, a configuration of the image reading apparatus comprising the ADF in which two image reading units are provided to read front and back of the original by one conveyance (referred to as one path both-surface reading) to improve productivity is also known. In such a configuration, it is necessary to perform shading operation on an image reading unit which reads a back surface of the original as well as on a front surface. Thereby, the image reading apparatus comprises a back surface reference white board which is necessary for the shading operation.

As a configuration of the back surface reference white board, there is one in which a platen glass board which is movable using a motor as the driving source is laid near a position opposite to a back surface reading unit and the back surface reference white board is provided on a part of a surface of the platen glass board. In such a configuration, by moving the platen glass board, the back surface reference white board provided on the platen glass board is made to oppose the back surface reading unit. Then, by reading the reference white board, the shading operation is performed on the back surface. The platen glass board is an example of the driven unit.

Further, as a position detector for detecting a movement of the driven unit itself or for detecting an action by the movement of the driven unit, a sensor is used, for example. In case of the platen glass board as mentioned, a home position sensor for detecting that the platen glass board is positioned within a predetermined range is used. In the movement of the platen glass board, by controlling the motor which is the driving source based on an output of the home position sensor, it becomes possible to position the platen glass board at a desired position.

In a driving device comprising the driving source, the driven unit, and the position detector, in a case where a driving abnormality (for example, step-out of the motor) or a position detection abnormality (for example, sensor failure) occurs, a method to determine these abnormalities is devised. For example, in Japanese Patent Application Laid-Open No. 2014-240141, a motor (driving source) is driven for a predetermined time by a driving force capable of moving a moving unit (driven unit) even when a load applied to the moving unit (driven unit) exceeds a predetermined value. Then, the Japanese Patent Application Laid-Open No. 2014-240141 detects a moving amount at that time by a measurement means (position detector) and determines that the abnormality occurs in the measurement means in a case where the moving amount is less than a threshold.

However, in the technology disclosed in the Japanese Patent Application Laid-Open No. 2014-240141, to execute the abnormality determining processing, the driving force larger than that required at the time of normally driving the motor needs to be secured. Thereby, in a driving device which is optimally designed for the normal drive, there is a possibility that the abnormality determining processing cannot be executed due to insufficiency of the driving force.

In addition, to secure the large driving force, a motor of larger output needs to be used or a current supplied to the motor needs to be increased. In that case, a manufacturing cost, a size, and power consumption of the driving device increase.

SUMMARY OF THE INVENTION

An image reading apparatus according to the present disclosure includes, a movable moving unit; a driving unit configured to move the moving unit, a driving abnormality detector configured to detect a driving abnormality of the driving unit; a position detector configured to change its output in accordance with a position of the moving unit; and a controller configured to move the moving unit by controlling operation of the driving unit based on an output change of the position detector, wherein the controller is further configured to: determine that a driving abnormality has occurred in a case where the driving abnormality detector detects an abnormality while moving the moving unit and determine that a position detection abnormality has occurred in a case where the output of the position detector does not change though the moving unit is moved by a predetermined distance or more in a state where no abnormality is detected by the driving abnormality detector.

Further features of the present invention will become apparent from the following description of exemplary embodiments (with reference to the attached drawings).

BRIEF DESCRIPTION OF THE DRAWINGS

FIG. 17 is a flowchart showing an example of control in the moving amount control after an output of an optical system HP sensor in the front surface reading unit is changed to ON.

FIG. 21A, FIG. 21B, FIG. 21C, and FIG. 21D are diagrams for describing relation between the movement of the back surface glass unit and an output value of the glass HP sensor.

DESCRIPTION OF THE EMBODIMENTS

In the following, embodiments will be described with reference to the accompanying drawings. In the embodiments, a driving device according to the present disclosure is applied to an image reading apparatus.

First Embodiment

Figure 1:
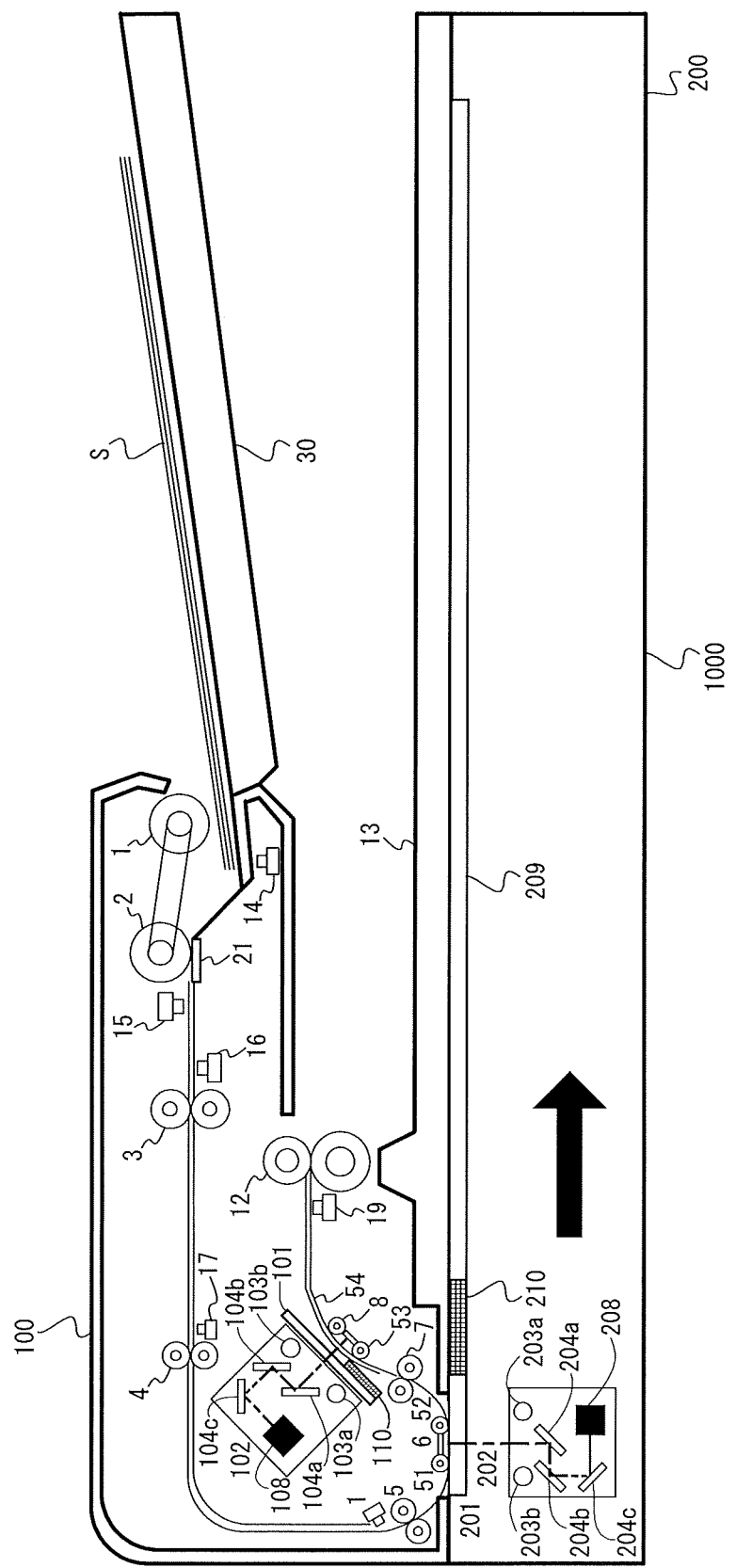
FIG. 1 is a sectional view showing an example of an image reading apparatus including the ADF.

In the following, configuration examples of image reading apparatus and image forming apparatus of the present embodiment is explained. FIG. 1 is a sectional view showing an example of an image reading apparatus including the ADF. An image reading apparatus 1000 of the present embodiment comprises an image reading part for reading an image of an original (hereinafter, referred to as reader) 200 and an auto document feeding part (hereinafter, referred to as ADF) 100. Further, a controller 300 (not shown) is connected to the image reading apparatus 1000. In the following, operation of the ADF 100 is described with reference to FIG. 1.

<Configuration Example of ADF>

In the following, one-surface original reading operation (hereinafter, referred to as one-surface original feeding reading) using the ADF 100 is explained. The ADF 100 comprises an original tray 30 on which an original bundle S consisting of one or more original sheets is stacked. The ADF 100 also comprises a separation pad 21 for restricting advancement of the original bundle S from the original tray 30 to a downstream side before conveyance of the original is started, a separation roller 2 and a sheet feeding roller 1. An original detection sensor 14 is arranged on the original tray 30, which enables to determine presence/absence of the original on the original tray 30 in accordance with a detection result of the sensor. The sheet feeding roller 1 falls on an original surface of the original bundle S stacked on the original tray 30 and rotates. Thus, the original of a top most surface of the original bundle is fed. The original fed by the sheet feeding roller 1 is separated one by one by an action of the separation roller 2 and the separation pad 21. The separation is achieved by a well-known separation technology.

The original separated by the separation roller 2 and the separation pad 21 is conveyed to a conveyance roller 4 by a drawing roller 3. A sheet feeding path is provided on a downstream side of the conveyance roller 4. The path is to convey the original having passed through the conveyance roller 4 in a direction of a front surface original feeding-reading glass 201. The original sent to the sheet feeding path is conveyed to a front surface original feeding-reading position by a front surface reading conveyance roller 5, a front surface reading upstream roller 51 and a front surface reading downstream roller 52. A front surface of the original which passes through between the front surface original feeding-reading glass 201 and a front surface glass opposed member 6 is irradiated by an LED 203*a* and an LED 203*b*. While the reflection light is reflected through a plurality of mirrors 204*a*, 204*b* and 204*c*, a surface image of the original is read by a front surface reading sensor 208 by one line (hereinafter, referred to as front surface reading).

The original conveyed by the front surface reading downstream roller 52 is conveyed by a back surface reading conveyance roller 7, a back surface reading upstream roller 53, and a back surface reading downstream roller 54. Thereafter the original is conveyed to a sheet delivery tray 13 by a sheet delivery roller 12. In a case where there are a plurality of originals on the original tray 30, the sheet feeding and separation from the original bundle S, the conveyance processing, the one-surface reading processing at the front surface original feeding-reading position and the sheet delivery processing as mentioned are repeated until the front surface reading of a final original is finished and the final original is delivered to the sheet delivery tray 13.

<Both-Surface Original Reading>

In the following, both-surface original reading operation using the ADF 100 (hereinafter, referred to as both-surface original feeding reading) is described. It is noted that the both-surface original feeding reading is the operation in which reading operation of the back surface of the original is added to the reading operation of the front surface of the original in the one-surface original feeding reading. Further, the sheet feeding, the separation, the conveyance, and the surface reading of the original are similar to those at the time of the one-surface original feeding reading as mentioned so that the description is omitted.

The original conveyed by the front surface reading downstream roller 52 is conveyed to the back surface original feeding-reading position by the back surface reading conveyance roller 7, the back surface reading upstream roller 53, and the back surface reading downstream roller 54. Before the original reaches the back surface original feeding-reading position, a back surface original feeding-reading glass 101 which is configured to be movable is moved to a position shown in FIG. 1 (hereinafter, referred to as back surface original reading position). A back surface of the original which passes through between the back surface original feeding-reading glass 101 and a back surface glass opposed member 8 is irradiated by an LED 103a and an LED 103b. While the reflection light is reflected through a plurality of mirrors 104a, 104b and 104c, a back surface image of the original is read by a back surface reading sensor 108 (hereinafter, referred to as back surface reading). The original conveyed by the back surface reading downstream roller 54 is conveyed to the sheet delivery tray 13 by the sheet delivery roller 12.

For example, it is supposed that a plurality of originals are on the original tray 30. In this case, the sheet feeding and separation from the original bundle S, the conveyance processing, the front and back surfaces reading processing and the sheet delivery processing are repeated until the front surface reading and the back surface reading of the final original are finished and the final original is delivered to the sheet delivery tray 13.

<Conveyance Control>

Rollers used to convey the original (for example, the sheet feeding roller 1, the separation roller 2, the drawing roller 3, the conveyance roller 4, the front surface reading conveyance roller 5, the front surface reading upstream roller 51) rotate using a conveyance system motor 120 (one or more motors not shown in FIG. 1) as the driving source. It is noted that, the front surface reading downstream roller 52, the back surface reading conveyance roller 7, the back surface reading upstream roller 53, the back surface reading downstream roller 54, and the sheet delivery roller 12 are rotationally driven as well. A conveyance system sensor 121 (sensors 15, 16, 17 and the like provided at each position on the conveyance path) detects the presence/absence of the original or the position of the original on the conveyance path. Then, in accordance with the detection result, the sheet feeding, the separation, the conveyance processing of the original, the reading of the original at the front surface and back surface original feeding-reading positions, and the sheet delivery processing are performed. In the following, operation of the reader 200 is described with reference to FIG. 1.

<Configuration Example of Image Reading Part (Reader)>

The reader 200 moves a front surface reading unit 202 which is the moving unit configured to be movable by an optical system motor 226 (not shown in FIG. 1) in a sub-scanning direction indicated by an arrow in FIG. 1 at constant speed. Thus, the reader 200 reads image information recorded on the original placed on an original platen glass 209 by one line by the front surface reading sensor 208 (hereinafter, referred to as fixed reading).

Further, the reader 200 moves the front surface reading unit 202 at a center position of the front surface glass opposed member 6 of the ADF 100 (hereinafter, referred to as front surface original feeding-reading original reading position). Then, the reader 200 feeds and conveys the original stacked on the original tray 30 in the manner as previously mentioned to read the front surface of the original by the front surface reading sensor 208 (one-surface original feeding reading). When reading the both surfaces of the original stacked on the original tray 30, the reader 200 reads the front surface in the same manner as the one-surface original feeding reading and reads the back surface by a back surface reading unit 102 equipped in the ADF 100 as mentioned (both-surface original feeding reading).

<Shading Control>

A front surface shading white board 210 and a back surface shading white board 110 which are reference white boards are white boards for generating white level reference data by shading. Reference data for the front surface and the back surface are respectively generated by reading the front surface shading white board 210 and the back surface shading white board 110 respectively by the front surface reading unit 202 and the back surface reading unit 102 and performing image processing before reading the original.

The front surface shading white board 210 is fixed between the front surface original feeding-reading glass 201 and the original platen glass 209. The front surface reading unit 202 is configured to be movable by driving the optical system motor 226. The front surface reading unit 202 which is the driven unit is moved and stopped at a position opposite to the front surface shading white board 210 (hereinafter, referred to as front surface shading position). Thus, the front surface shading white board 210 is turned to a readable state. The front surface shading white board 210 is read in a state where the front surface reading unit 202 is stopped at the front surface shading position to generate the white level reference data for the front surface reading.

On the other hand, the back surface shading white board 110 is disposed on the back surface original feeding-reading glass 101 which is the moving unit configured to be movable by a glass motor 122 (not shown in FIG. 1). Further, the back surface reading unit 102 is fixedly disposed at a position shown in FIG. 1. By driving the glass motor 122, the back surface original feeding-reading glass 101 which is the driven unit is moved. Then, the back surface original feeding-reading glass 101 is stopped so that the back surface shading white board 110 is positioned on an opposite surface of the back surface reading unit 102 (hereinafter, referred to as back surface shading position). Thereby, the back surface shading white board 110 is turned to a readable state. The back surface shading white board 110 is read in a state where the back surface original feeding-reading glass 101 is stopped at the back surface shading position to generate the white level reference data for the back surface reading. After reading the original, based on the white level reference data for the front surface and the back surface, the read image is corrected.

Figure 2A:
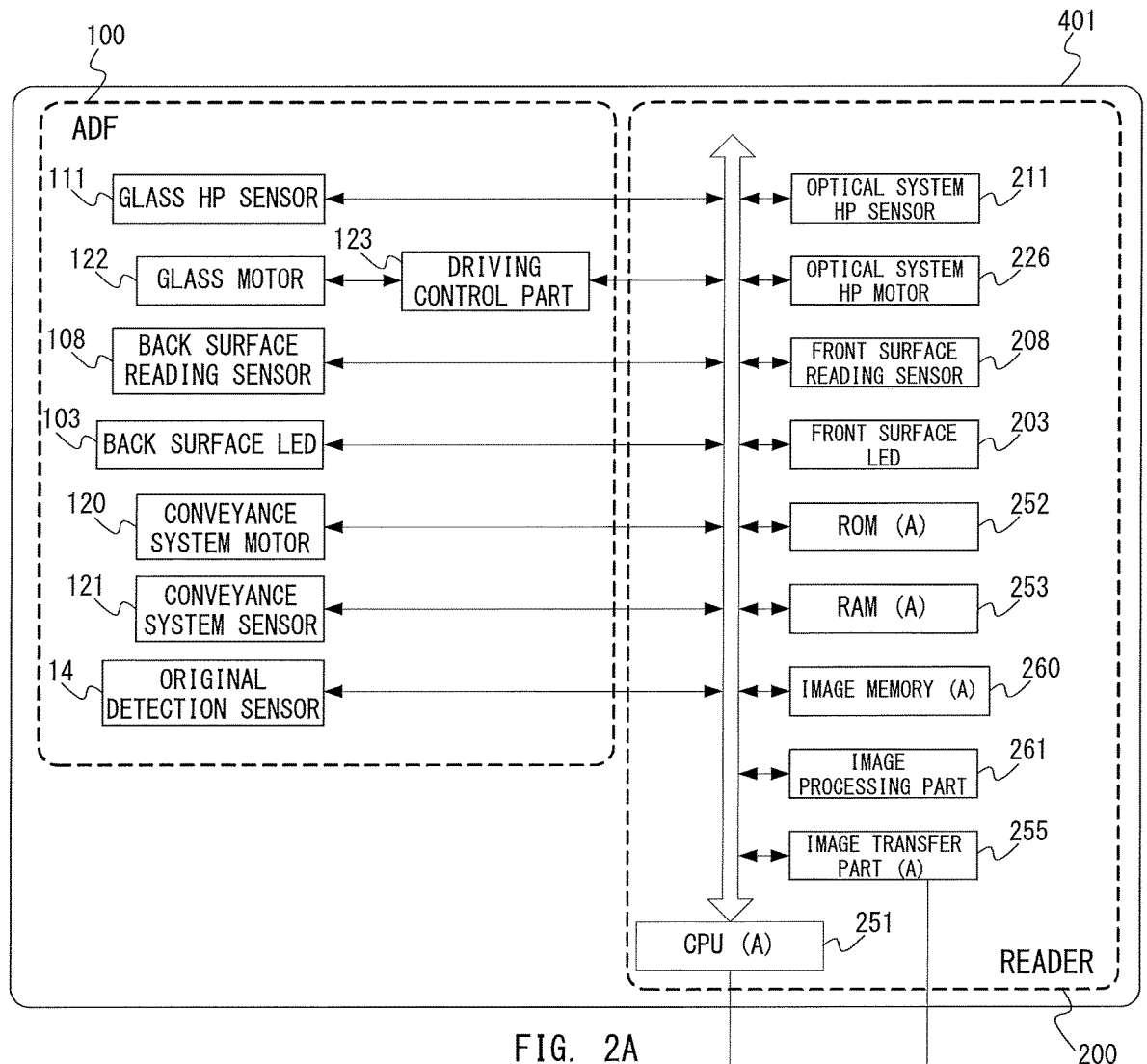
FIG. 2A and FIG. 2B are block diagrams each showing a configuration example of a control part included in the image reading apparatus.
Figure 2B:
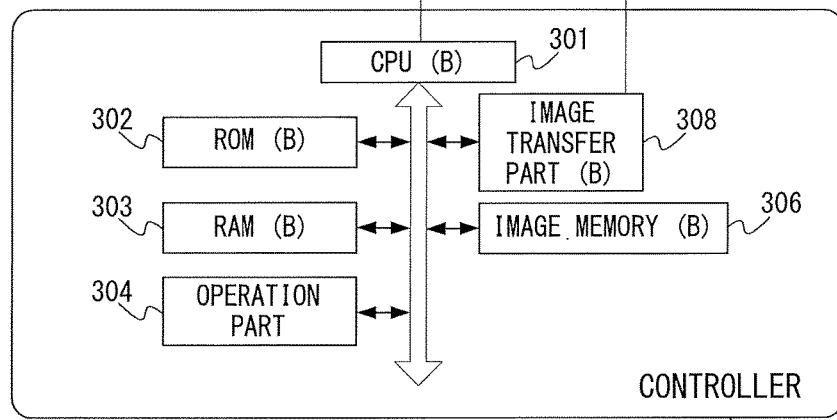

FIG. 2A and FIG. 2B are block diagrams each showing a configuration example of a control part included in the image reading apparatus 1000. FIG. 2A is a block diagram of the reader 200 and the ADF 100. FIG. 2B is a block diagram of the controller 300.

A CPU(A) 251 shown in FIG. 2A is a central processing unit which totally controls each unit of the reader 200 and the ADF 100. A ROM(A) 252 is a storage device in which control contents to be executed by the CPU(A) 251 are stored. A RAM(A) 253 is a storage device used as a work area necessary for the CPU(A) 251 to perform control.

The CPU(A) 251 is respectively connected to a front surface LED 203, the front surface reading sensor 208, a back surface LED 103, the back surface reading sensor 108, the optical system motor 226 for moving the front surface reading unit 202 in a sub-scanning direction, and an optical system HP (Home Position) sensor 211. Also, the CPU(A) 251 is respectively connected to the glass motor 122 for moving a back surface glass unit 125 which is the moving unit, a glass HP sensor 111, and a driving control part 123 for controlling the drive of the glass motor 122. Also, the CPU(A) 251 is respectively connected to an image memory (A) 260, an image processing part 261, and an image transfer part (A) 255.

The front surface reading sensor 208 and the back surface reading sensor 108 are sensors for scanning the image of the original to read the image by every one line. The image memory (A) 260 is a storage device for temporarily storing the image data read by the front surface reading sensor 208 and the back surface reading sensor 108. The image processing part 261 corrects the read image stored in the image memory (A) 260 by performing the image processing. The image transfer part (A) 255 transfers the image data having the image processing applied by the image processing part 261 to an image transfer part (B) 308 of the controller 300 which will be described later.

To realize an original conveying function, the conveyance system motor 120 for driving various rollers for the conveyance and the conveyance system sensor 121 provided at various locations on the conveyance path are respectively connected to the CPU(A) 251. Further, an original detection sensor 14 for determining the presence/absence of the original on the original tray 30 is connected to the CPU(A) 251.

<Configuration of Controller>

The controller 300 shown in FIG. 2B controls an entire image reading system including the reader 200 and the ADF 100. A CPU(B) 301 is a central processing unit which totally controls each unit of the controller 300. A ROM(B) 302 is a storage device in which control contents to be executed by the CPU(B) 301 are stored. A RAM(B) 303 is a storage device used as a work area necessary for the CPU(B) 301 to perform control.

The image transfer part (B) 308 receives the image from the image transfer part (A) 255 and stores the received result in an image memory (B) 306. An operation part 304 instructs operation from a user to the entire image reading system, displays a message to the user, and displays the image read.

CPU(B) 301 exchanges a control command relating to image reading control and transfers data for the control through a communication line 401 with the CPU(A) 251. For example, the CPU(B) 301 receives an image reading start instruction of the user from the operation part 304 and transmits an image reading start request to the CPU(A) 251. Further, the CPU(B) 301 receives an original size setting instruction of the user from the operation part 304 and transmits a size of the original (main scanning width and sub-scanning length) to the CPU(A) 251. For example, the CPU(B) 301 receives an abnormality occurrence notification from the CPU(A) 251 and causes the operation part 304 to display the message to the user in accordance with a type of the abnormality.

<Movement of Back Surface Glass>

Figure 3A:
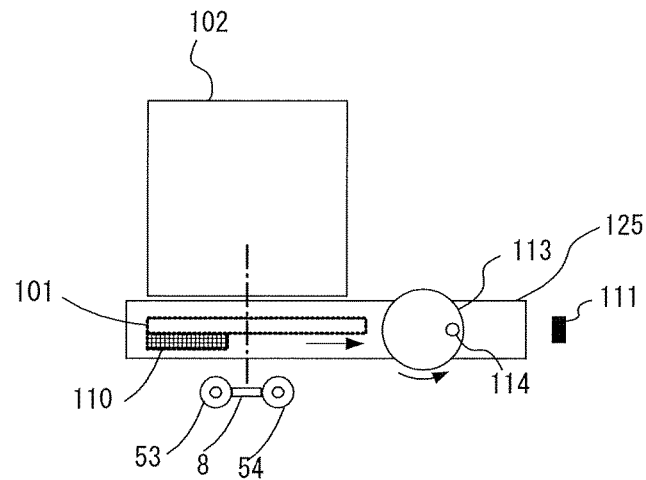
FIG. 3A and FIG. 3B are sectional views each showing a configuration example relating to a movement of a back surface glass.
Figure 3B:
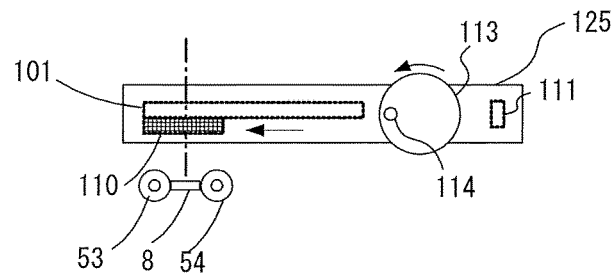

FIG. 3A and FIG. 3B are sectional views each showing a configuration example relating to a movement of the back surface glass. It is noted that each one-dot chain line in FIG. 3A and FIG. 3B shows an image reading target position of the back surface reading unit 102.

FIG. 3A shows a state where the back surface glass unit 125 is stopped at the back surface original reading position. The back surface glass unit 125 comprises the back surface original feeding-reading glass 101 and the back surface shading white board 110 attached to the back surface original feeding-reading glass 101. When the back surface glass unit 125 is stopped at the back surface original reading position, it is possible to read the image on the original which passes through between the back surface original feeding-reading glass 101 and the back surface glass opposed member 8 by one line at the position indicated by the one-dot chain line through the back surface reading unit 102.

FIG. 3B shows a state where the back surface glass unit 125 is stopped at the back surface shading position. When the back surface glass unit is stopped at the back surface shading position, it is possible to read the image on the back surface shading white board 110 by one line through the back side reading unit 102 at the position indicated by the one-dot chain line. As mentioned, when the both-surface original reading is performed, the back surface glass unit 125 is stopped at the back surface original reading position shown in FIG. 3A and when shading, the back surface glass unit 125 is stopped at the back surface shading position shown in FIG. 3B. In the following, one example of control of the movement of the back surface glass unit 125 between the back surface original reading position and the back surface shading position is explained.

The back surface glass unit 125 is configured to be movable by driving the glass motor 122 which is not shown. When driving the glass motor 122, its rotation is transmitted to a cam 113 through a cam shaft 114. With a rotation of the cam 13 in a curved arrow direction in the figure, the back surface glass unit 125 moves in a straight arrow direction in the figure. The glass HP sensor 111 is disposed at a position shown in FIG. 3A and FIG. 3B. When the back surface glass unit 125 moves, a moving amount of the back surface glass unit 125 is controlled in accordance with an output change of the glass HP sensor 111.

The glass HP sensor 111 is a photo interrupter each having, for example, a light emitting part and a light receiving part respectively on the front side and the back side in the drawing of the back surface glass unit 125 shown in FIG. 3A and FIG. 3B. When the back surface glass unit 125 moves, light from the light emitting part of the glass HP sensor 111 is shielded or transmitted by the back surface glass unit 125. Then, the output of the glass HP sensor 111 is changed to ON (when shielded) or OFF (when transmitted).

In the present embodiment, when the back surface glass unit 125 is stopped at the back surface original reading position, the output of the glass HP sensor 111 is OFF (FIG. 3A). Further, when the back surface glass unit 125 is stopped at the back surface shading position, the output of the glass HP sensor 111 is ON (FIG. 3B). Details of position detection of the back surface glass unit 125 using the glass HP sensor 111 will be described later.

Further, by stopping the back surface glass unit 125 after moving the back surface glass unit 125 by a predetermined distance from timing when the output of the glass HP sensor 111 is changed, it is possible to stop the back surface glass unit 125 at a desired position. As mentioned, as the back surface glass unit 125 moves by driving the glass motor 122, it becomes possible to control the moving amount of the back surface glass unit 125 by counting a drive pulse of the glass motor 122. Details of the moving amount control will be described later.

<Configuration of Driving Control Part>

Figure 4:
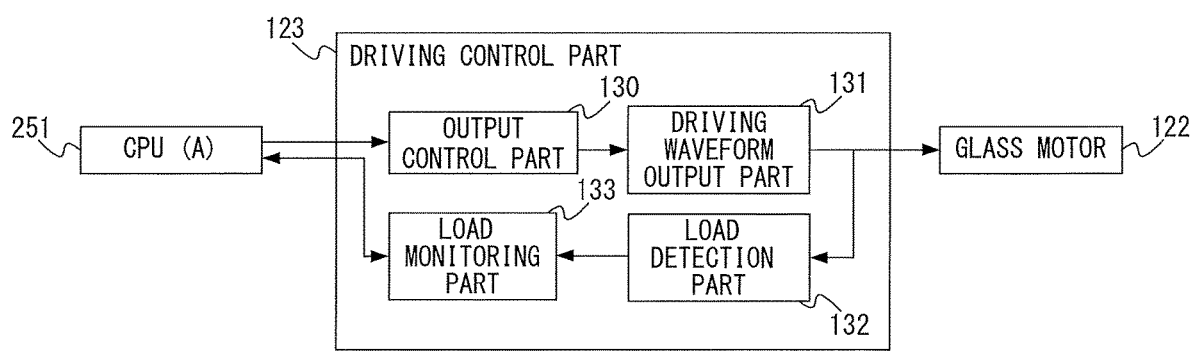
FIG. 4 is a block diagram showing a configuration example of a driving control part.

FIG. 4 is a block diagram showing a configuration example of the driving control part 123. As mentioned, the driving control part 123 for controlling the drive of the glass motor 122 is connected to the CPU(A) 251. An output control part 130 communicates with the CPU(A) 251 with regard to information on the drive of the glass motor 122. Based on the information, the output control part 130 controls a driving waveform output part 131 which will be explained later.

For example, before starting to drive the glass motor 122, the output control part 130 receives command information such as a rotation direction, an initial speed, a target speed, and acceleration of the glass motor 122 from the CPU(A) 251. At the time of starting to drive the glass motor 122, the output control part 130 receives a driving start command from the CPU(A) 251. The output control part 130 receives the command information such as stop of drive, specification of the number of pulses until the stop of drive and the like from the CPU(A) 251 during the drive of the glass motor 122.

In accordance with the command from the output control part 130, the driving waveform output part 131 outputs a signal for driving the glass motor 122. A load detection part 132 detects information on a load applied to the glass motor 122 from the driving waveform of the glass motor 122 during the drive of the glass motor 122 and outputs the information to a load monitoring part 133. Before starting to drive the glass motor 122, the load monitoring part 133 receives a threshold for determining an overload of the glass motor 122 from the CPU(A) 251. The load monitoring part 133 monitors the load information detected by the load detection part 132 during the drive of the glass motor 122 and outputs an overload detection signal indicating the presence/absence of occurrence of the overload to the CPU (A) 251.

<Driving Abnormality Detection>

Figure 5A:
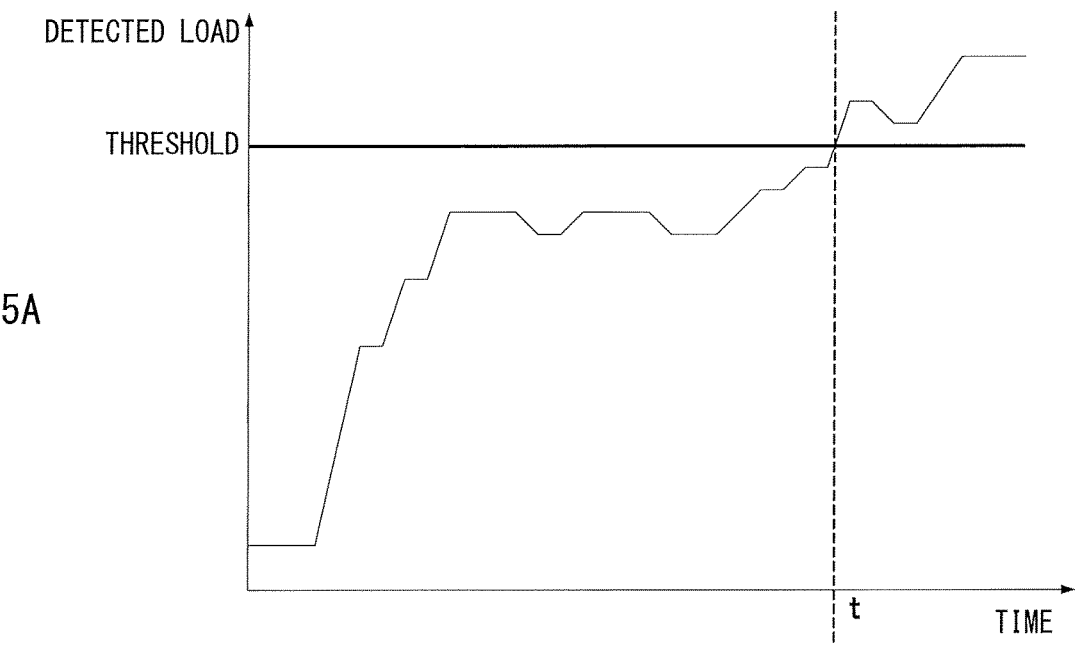
FIG. 5A and FIG. 5B are graphs each showing an example of a load change at the time of driving the glass motor and an output of an overload detection signal of a load monitoring part.
Figure 5B:
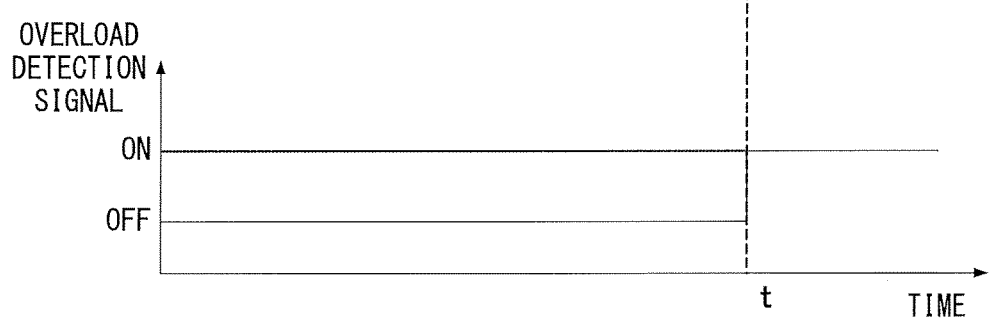

FIG. 5A and FIG. 5B are graphs each showing an example of a load change at the time of driving the glass motor 122 and an output of the overload detection signal of the load monitoring part 133. Using FIG. 5A and FIG. 5B, driving abnormality detection is described. FIG. 5A is a graph showing a load of the glass motor 122 which changes with a lapse of time. The example in FIG. 5A indicates that a detected load exceeds the threshold at time t indicated by a broken line.

FIG. 5B is a graph showing the output of the overload detection signal of the load monitoring part 133 which corresponds to FIG. 5A. As shown in FIG. 5B, the overload detection signal of the load monitoring part 133 is OFF when the detected load does not exceed the threshold. The overload detection signal of the load monitoring part 133 is ON when the detected load exceeds the threshold. FIG. 5B indicates that the detected load exceeds the threshold at the time t and the output of the overload detection signal of the load monitoring part 133 is changed from OFF to ON.

In a case where the overload is generated during the drive of the glass motor 122, in a case where the glass motor 122 continues driving, there is a possibility that the glass motor 122 is stepped out. In a case where the glass motor 122 is stepped out, it becomes impossible to normally control the drive of the glass motor 122. Thereby, in a case where the overload is generated, proper processing such as stop of the glass motor 122 needs to be performed.

Here, the threshold for determining the overload by the load monitoring part 133 is a value specified by the CPU(A) 251 before driving the glass motor 122 as mentioned. In designing the image reading apparatus 1000, a threshold Th is determined with a margin to the maximum load which occurs in the normal drive of the glass motor 122. The CPU(A) 251 transmits the information on the threshold Th to the driving control part 123 before driving the glass motor 122.

In a case where the detected load exceeds the threshold with respect to the threshold Th determined in this manner, it means that an abnormal load (overload) which is not normally generated is generated. In this case, due to the change of the overload detection signal which is output by the load monitoring part 133, the CPU(A) 251 can know the occurrence of the overload. Thus, the CPU(A) 251 can perform proper processing. Further, in detecting the driving abnormality, no drive force larger than that required when normally driving the motor is required.

It is noted that in the present embodiment, the driving control part 123 is configured to detect the driving abnormality (overload) of the glass motor 122 by the above mentioned manner. However, the present disclosure is not limited to this. For example, the driving control part 123 may comprise a rotation position detector of the glass motor 122. The driving control part 123 may detect the occurrence of the driving abnormality (step-out) when it determines that the glass motor 122 is stopped based on the detection result of the rotation position detector.

<Position Detection>

Here, a configuration of detecting the position of the back surface glass unit 125 using the glass HP sensor 111 is described using FIG. 19A, FIG. 19B, FIG. 20A, FIG. 20B, FIG. 21A, FIG. 21B, FIG. 21C, and FIG. 21D. As mentioned, the back surface glass unit 125 comprises the back surface original feeding-reading glass 101 and the back surface shading white board 110 attached to the back surface original feeding-reading glass 101. Adding these, the back surface glass unit 125 comprises a glass holder 125a which holds the back surface original feeding-reading glass 101 and the back surface shading white board 110 and a flag 125b which is adhered to the glass holder 125a.

Figure 19A:
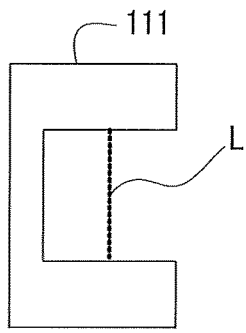
FIG. 19A and FIG. 19B are side views each describing positional relation between a glass HP sensor and the back surface glass unit.
Figure 19B:
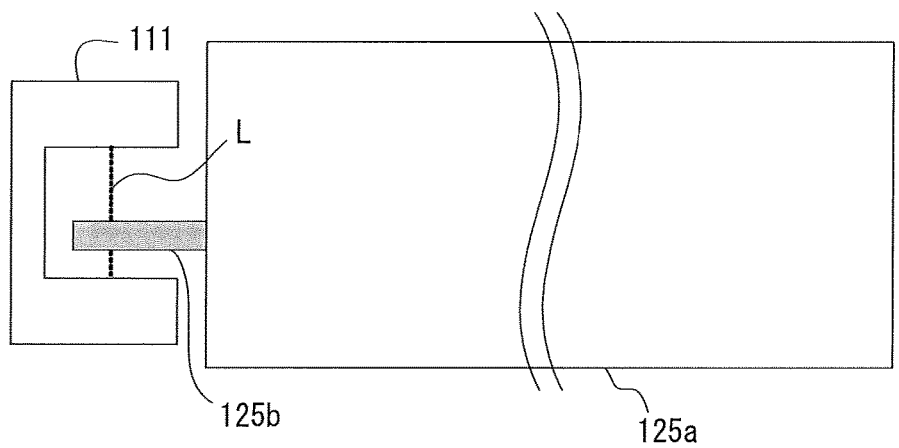
Figure 20A:
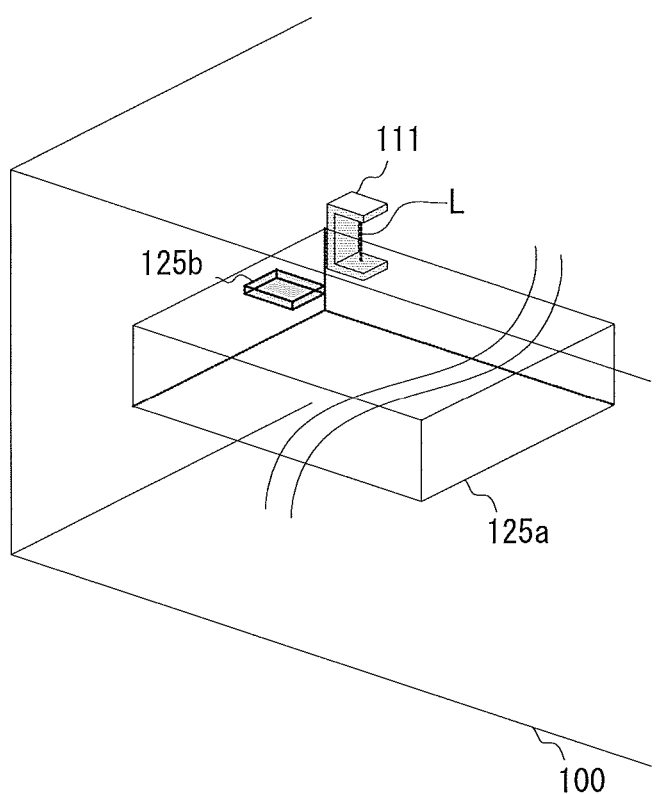
FIG. 20A and FIG. 20B are perspective views each describing positional relation between the glass HP sensor and the back surface glass unit.
Figure 20B:
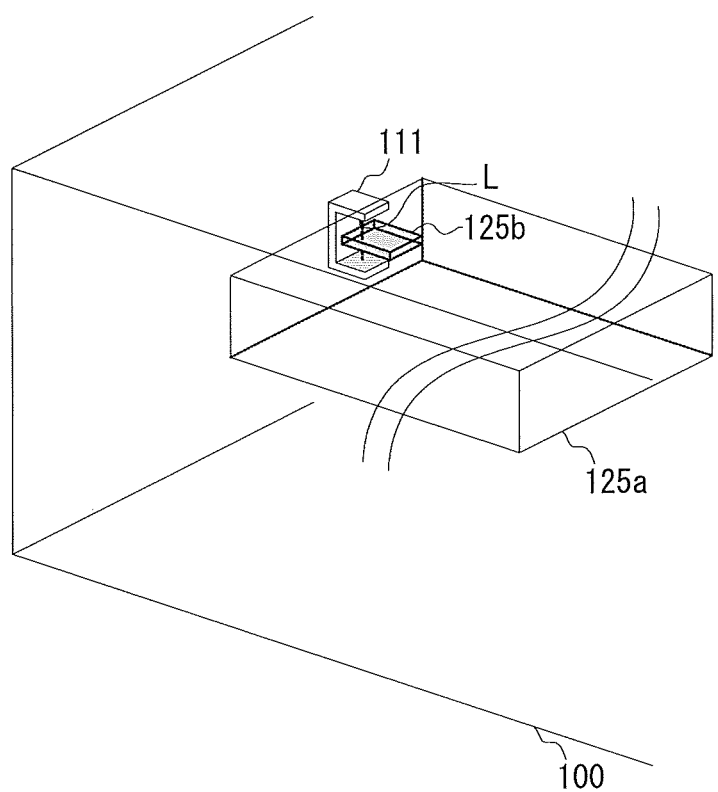

FIG. 19A and FIG. 19B are side views each describing positional relation between the glass HP sensor 111 and the back surface glass unit 125. FIG. 19A is a diagram when the output of the glass HP sensor 111 is OFF. FIG. 19B is a diagram when the output of the glass HP sensor 111 is ON. FIG. 20A and FIG. 20B are perspective views each describing positional relation between the glass HP sensor 111 and the back surface glass unit 125. FIG. 20A is a diagram when the output of the glass HP sensor 111 is OFF. FIG. 20B is a diagram when the output of the glass HP sensor 111 is ON.

As mentioned, the glass HP sensor 111 is configured as the photo interrupter. Infrared rays are irradiated to a space L indicated by a dotted line in FIG. 19A, FIG. 19B, FIG. 20A, and FIG. 20B. While the flag 125b is positioned in the space L, the irradiated infrared ray is blocked by the flag 125b so that the output of the glass HP sensor 111 is ON.

FIG. 21A through FIG. 21D are diagrams for describing relation between the movement of the back surface glass unit 125 and the output value of the glass HP sensor 111. FIG. 21A is a sectional view showing a state where the back surface glass unit 125 is stopped at the back surface original reading position. FIG. 21B is a top view showing a state where, similar to FIG. 21A, the back surface glass unit 125 is stopped at the back surface original reading position. FIG. 21C is a sectional view showing a state where the back surface glass unit 125 is stopped at the back surface shading position. FIG. 21D is a top view showing a state where, similar to FIG. 21C, the back surface glass unit 125 is stopped at the back surface shading position.

In this embodiment, a right edge E1 of the flag 125b shown in FIG. 21B and FIG. 21D is positioned to left in FIG. 21A through FIG. 21D with respect to a detection position D (position in a right and left direction in FIG. 21A through FIG. 21D of the space L shown in FIG. 19A, FIG. 19B, FIG. 20A, and FIG. 20B) of the glass HP sensor 111 shown in FIG. 21B and FIG. 21D. In this case, the flag 125b does not block the infrared ray irradiated to the space L so that the output of the optical system HP sensor 211 is OFF (FIG.

21A, FIG. 21B). On the other hand, in a case where the right edge E1 of the flag 125b is positioned to right in FIG. 21A through FIG. 21D with respect to the detection position D, the flag 125b blocks the infrared ray irradiated to the space L so that the output of the glass HP sensor 111 is ON (FIG. 21C, FIG. 21D).

<Moving Amount Control>

Figure 6A:
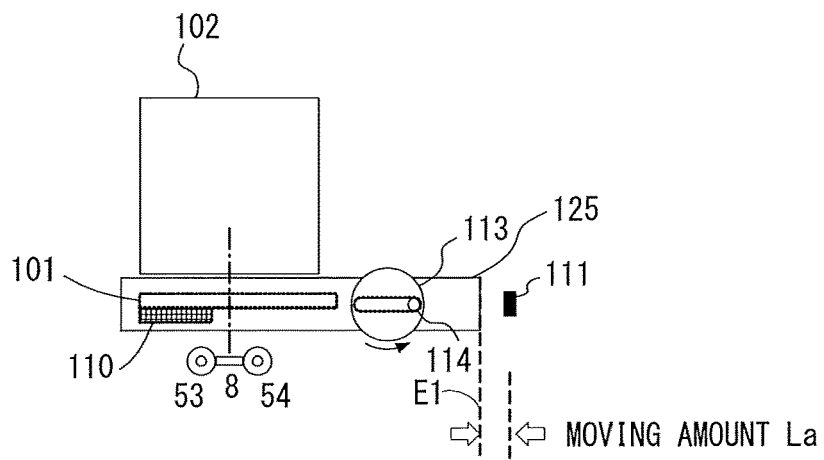
FIG. 6A, FIG. 6B, FIG. 6C, FIG. 6D, FIG. 6E, and FIG. 6F are sectional views for describing the movement of a back surface glass unit.
Figure 6B:
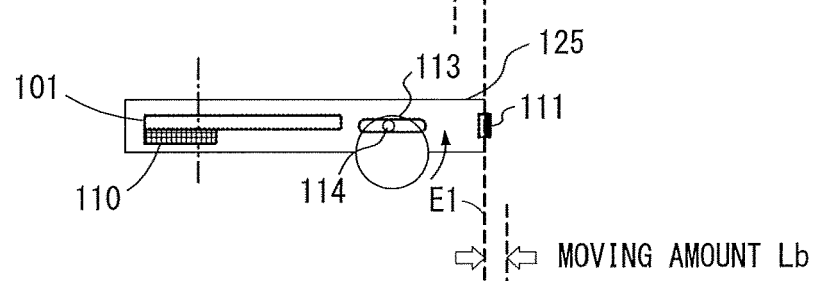
Figure 6C:
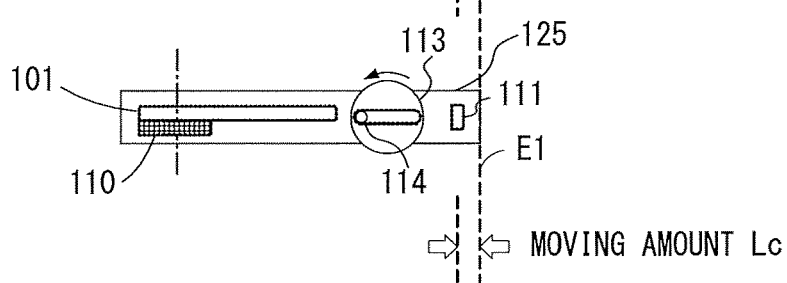
Figure 6D:
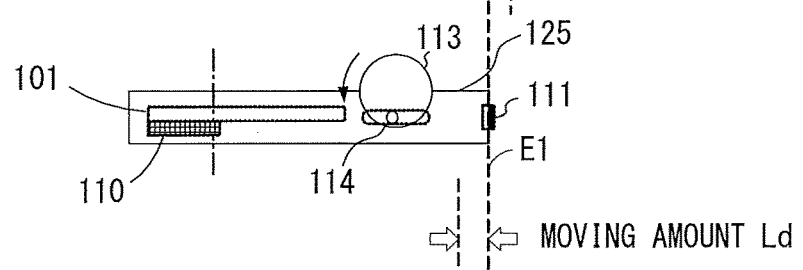
Figure 6E:
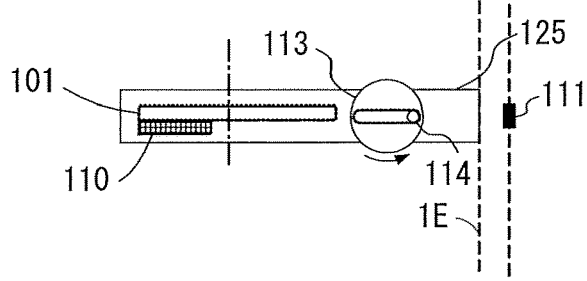

FIG. 6A through FIG. 6F are sectional views for describing the movement of the back surface glass unit 125. In the following, the moving amount control in the movement of the back surface glass unit 125 is described using FIG. 6A through FIG. 6F. FIG. 6A shows a state where the back surface glass unit 125 is positioned at the back surface original reading position. FIG. 6B shows a state where the output of the glass HP sensor 111 is turned to ON while the back surface glass unit 125 moves from the back surface original reading position to the back surface shading position. FIG. 6C shows a state where the back surface glass unit 125 is positioned at the back surface shading position. FIG. 6D shows a state where the output of the glass HP sensor 111 is turned to OFF while the back surface glass unit 125 moves from the back surface shading position to the back surface original reading position. FIG. 6E shows a state where, similar to FIG. 6A, the back surface glass unit 125 is positioned at the back surface original reading position.

As indicated by a dotted line and a void arrow between FIG. 6A and FIG. 6B, the moving amount of the back surface glass unit 125 from the state shown in FIG. 6A to the state shown in FIG. 6B is defined as a moving amount La. Similarly, a moving amount Lb indicates the moving amount of the back surface glass unit 125 indicated by the dotted line and the void arrow between FIG. 6B and FIG. 6C. A moving amount Lc indicates the moving amount of the back surface glass unit 125 indicated by the dotted line and the void arrow between FIG. 6C and FIG. 6D. A moving amount Ld indicates the moving amount of the back surface glass unit 125 indicated by the dotted line and the void arrow between FIG. 6D and FIG. 6E.

Figure 6F:
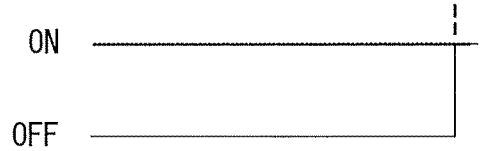

FIG. 6F is a diagram in which, using the right edge E1 of the flag 125b (which corresponds to the right edge of the back surface glass unit 125) indicated by the dotted line in FIG. 6A through FIG. 6E as a reference, a vertical axis represents the output of the glass HP sensor 111 and a horizontal axis represents a moving direction of the back surface glass unit 125. FIG. 6F shows the output change of the glass HP sensor 111 in accordance with the movement of the back surface glass unit 125. It is noted that in the present embodiment, a driving direction of the glass motor 122 is always constant. The direction corresponds to the rotation direction of the cam 113 indicated by the curved arrow in FIG. 6A through FIG. 6F rotating in a counterclockwise direction in the figures.

As mentioned, when the back surface glass unit 125 moves, the drive pulse of the glass motor 122 is counted in accordance with the output change of the glass HP sensor 111. Then, in accordance with the count result, the control of the moving amount of the back surface glass unit 125 is performed. When the back surface glass unit 125 is moved from the back surface original reading position to the back surface shading position, as shown in FIG. 6A, the output of the glass HP sensor 111 is OFF when the movement of the back surface glass unit 125 is started. Further, from FIG. 6A to FIG. 6B, when the back surface glass unit 125 is moved to the right in the figures by the moving amount La, the output of the glass HP sensor 111 is changed from OFF to ON. The drive pulse of the glass motor 122 from that point is counted. When the counted pulse number reaches a pulse number C1 which corresponds to the moving amount Lb, the glass motor 122 is stopped. Thus, the back surface glass unit 125 is stopped at the position shown in FIG. 6C or the back surface shading position.

When the back surface glass unit 125 is moved from the back surface shading position to the back surface original reading position, as shown in FIG. 6C, the output of the glass HP sensor 111 is ON when the movement of the back surface glass unit 125 is started. From FIG. 6C to FIG. 6D, when the back surface glass unit 125 is moved to the left in the figures by the moving amount Lc, the output of the glass HP sensor 111 is changed from ON to OFF. The drive pulse of the glass motor 122 from that point is counted. When the counted pulse number reaches a pulse number C2 which corresponds to the moving amount Ld, the glass motor 122 is stopped. Thus, the back surface glass unit 125 is stopped at the position shown in FIG. E or the back surface original reading position.

<Detection of Position Detection Abnormality>

As mentioned, when controlling the moving amount of the back surface glass unit 125 based on the output change of the glass HP sensor 111, in a case where the output of the glass HP sensor 111 is not changed for some reason, it is not possible to properly control the moving amount. Possible causes in this case include the driving abnormality and the position detection abnormality. In case of the driving abnormality, for example, in a case where the glass motor 122 steps out, the movement of the back surface glass unit 125 is prevented even when the glass motor 122 is controlled to drive. Further, as the movement of the back surface glass unit 125 is prevented, the output of the glass HP sensor 111 does not change.

In case of the position detection abnormality, for example, the glass HP sensor 111 failures and the output is always ON or OFF so that even when the back surface glass unit 125 is moved to the position where, originally, the output changes (the back surface glass unit 125 is moved more than a predetermined distance), the output will not change. The driving abnormality can be detected in a manner as previously mentioned. The position detection abnormality (sensor failure) is detected in a manner described in the following.

In the following, a configuration example for detecting the position detection abnormality in the movement of the back surface glass unit 125 is described using FIG. 6A through FIG. 6F. When the movement of the back surface glass unit 125 is started, in a case where the output of the glass HP sensor 111 is not changed from OFF to ON even when the back surface glass unit 125 is moved by a sufficient distance (ON reference moving amount), it can be determined that it is in a state where the output of the glass HP sensor 111 does not change. The sufficient distance in this case is a distance greater than a distance from a position immediately after the output of the glass HP sensor 111 is turned to ON (FIG. 6B) from where the back surface glass unit 125 continues moving to a position where, after the output of the glass HP sensor 111 is turned to OFF once (FIG. 6D), the output of the glass HP sensor 111 is turned to ON again (FIG. 6B). In particular, it is a distance greater than the moving amount of the back surface glass unit 125 (Lb+Lc+Ld+La).

Further, similarly, in a case where the output of the glass HP sensor 111 is not changed from ON to OFF even when the back surface glass unit 125 is moved by a sufficient distance (OFF reference moving amount), it can be determined that it is in a state where the output of the glass HP sensor 111 does not change. The sufficient distance in this case is a distance greater than a distance from a position immediately after the output of the glass HP sensor 111 is turned to OFF (state of FIG. 6D) from where the back surface glass unit 125 continues moving to a position where, after the output of the glass HP sensor 111 is turned to ON once (FIG. 6B), the output of the glass HP sensor 111 is turned to OFF again (FIG. 6D). In particular, it is the distance greater than the moving amount of the back surface glass unit 125 (Ld+La+Lb+Lc).

It is noted that, in the present embodiment, for both the ON reference moving amount and the OFF reference moving amount, moving amount L' is used. The moving amount L' is obtained by adding a margin a to a moving amount L representing one rotation of the cam 113 ((Expression 1) shown below).

$$L'=La+Lb+Lc+Ld+\alpha \quad \text{(Expression 1)}$$

It is supposed that the drive pulse of the glass motor 122 from the start of the movement of the back surface glass unit 125 is counted and no driving abnormality occurs until the counted pulse number reaches a pulse number C' which corresponds to the moving amount L'. Further, in a case where the output of the HP sensor 111 does not change as above, it is determined that the position detection abnormality occurs.

<Movement to the Back Surface Shading Position>

As mentioned, the back surface glass unit 125 is moved to the back surface shading position to read the back surface shading white board 110 by the back surface reading unit 102 to generate the white level reference data for the back surface reading before reading the original.

Figure 7:
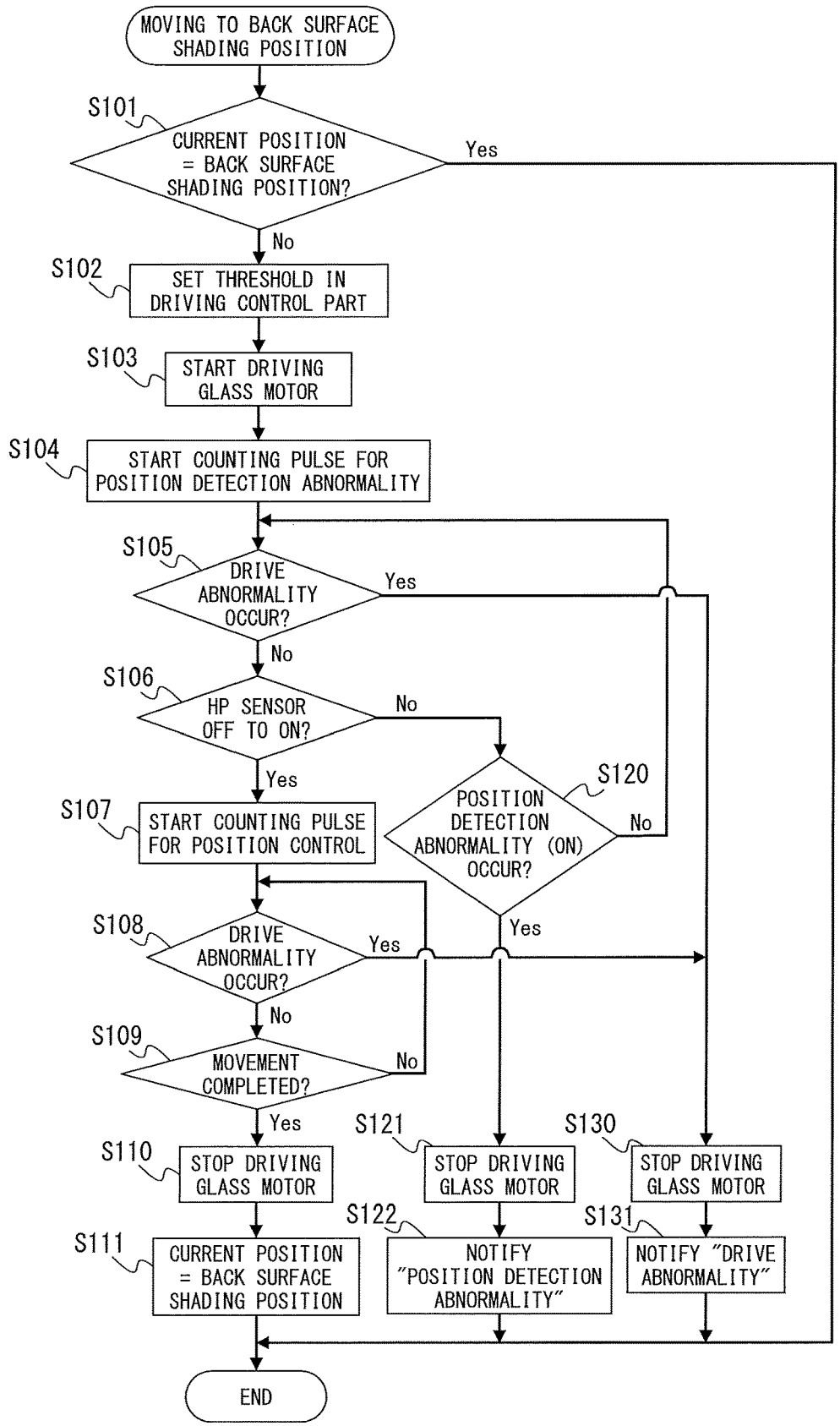
FIG. 7 is a flowchart showing an example of control in the movement of the back surface glass unit to a back surface shading position.

FIG. 7 is a flowchart showing an example of control in the movement of the back surface glass unit 125 to the back surface shading position. The CPU(A) 251 mainly executes each processing shown in FIG. 7. In the following, the control in the movement of the back surface glass unit 125 to the back surface shading position is described using FIG. 7.

The CPU(A) 251 determines whether a current position of the back surface glass unit 125 is the back surface shading position or not when moving the back surface glass unit 125 to the back surface shading position (S101). It is noted that when the CPU(A) 251 performs the movement control of the back surface glass unit 125, the CPU(A) 251 stores the position of the back surface glass unit 125 after the movement control in a predetermined area of the RAM(A) 253 as the current position.

If it is determined that the current position stored is the back surface shading position (Step S101: Yes), the CPU(A) 251 finishes the processing as the back surface glass unit 125 is already positioned at the back surface shading position and no movement is necessary.

If it is determined that the current position of the back surface glass unit 125 is not the back surface shading position (Step S101: No), the CPU(A) 251 performs the movement control of the back surface glass unit 125 to the back surface shading position. In particular, in a case where the current position stored is a position other than the back surface shading position or the current position is not fixed as the position control is not performed yet, the CPU(A) 251 performs the movement control of the back surface glass unit 125 to the back surface shading position.

The CPU(A) 251 sets the threshold Th for determining the overload of the glass motor 122 in the driving control part (Step S102). The CPU(A) 251 starts driving the glass motor 122 to start moving the back surface glass unit 125 (Step S103). The CPU(A) 251 starts counting the drive pulse of the glass motor 122 for the position detection abnormality detection (Step S104).

The CPU(A) 251 determines the presence/absence of the occurrence of the driving abnormality based on the overload detection signal which is output by the driving control part 123 (Step S105). In a case where the overload detection signal is ON or the overload is generated, the CPU(A) 251 determines that the driving abnormality occurs (Step S105: Yes) and stops driving the glass motor 122 (Step S130). The CPU(A) 251 transmits the abnormality occurrence notification of the driving abnormality to the CPU(B) 301 (Step S131) and finishes the processing.

In a case where the overload detection signal is OFF or no overload is generated, the CPU(A) 251 determines that no driving abnormality occurs (Step S105: No) and confirms the output change of the glass HP sensor 111 (Step S106).

In a case where the output of the glass HP sensor 111 is not changed from OFF to ON (Step S106: No), the CPU(A) 251 determines the presence/absence of the occurrence of the position detection abnormality based on the count value for the position detection abnormality detection (Step S120).

In a case where the count value is the pulse number C' which corresponds to the ON reference moving amount L' or higher, the CPU(A) 251 determines that the position detection abnormality occurs as the output of the glass HP sensor 111 is not changed from OFF to ON even when the back surface glass unit 125 is moved by the ON reference moving amount (Step S120: Yes). In this case, the CPU(A) 251 stops driving the glass motor 122 (Step S121). The CPU(A) 251 transmits the abnormality occurrence notification of the position detection abnormality to the CPU(B) 301 (Step S122) and finishes the processing. In a case where the count value is below the pulse number C', the CPU(A) 251 determines that no position detection abnormality occurs (Step S120: No) and shifts to the processing of the step S105 to perform the detection of the driving abnormality again.

In a case where the output of the glass HP sensor 111 is changed from OFF to ON (Step S106: Yes), the CPU(A) 251 starts counting the drive pulse of the glass motor 122 for the position control (Step S107). The CPU(A) 251 determines the presence/absence of the occurrence of the driving abnormality by the processing similar to the processing of the step S105 (Step S108). If it is determined that the driving abnormality occurs (Step S108: Yes), the CPU(A) 251 performs the processing similar to that of the step S105, in case of Yes (Step S130 through Step S131) and thereafter, finishes the processing.

If it is determined that no driving abnormality occurs (Step S108: No), the CPU(A) 251 determines whether the movement of the back surface glass unit 125 is completed or not based on the count value for the position control (Step S109). In a case where the count value does not match the pulse number C1 which corresponds to the moving amount Lb, the CPU(A) 251 determines that the movement of the back surface glass unit 125 to the back surface shading position is not completed (Step S109: No) and shifts to the processing of the step S108 to perform the detection of the driving abnormality again. In a case where the count value matches the pulse number C1, the CPU(A) 251 determines that the movement of the back surface glass unit 125 to the back surface shading position is completed (Step S109: Yes) and stops driving the glass motor 122 (Step S110). The CPU(A) 251 updates the current position stored in the predetermined area of the RAM(A) 253 to the back surface shading position (Step S111) and finishes the processing.

<Movement to the Back Surface Original Reading Position>

Figure 8:
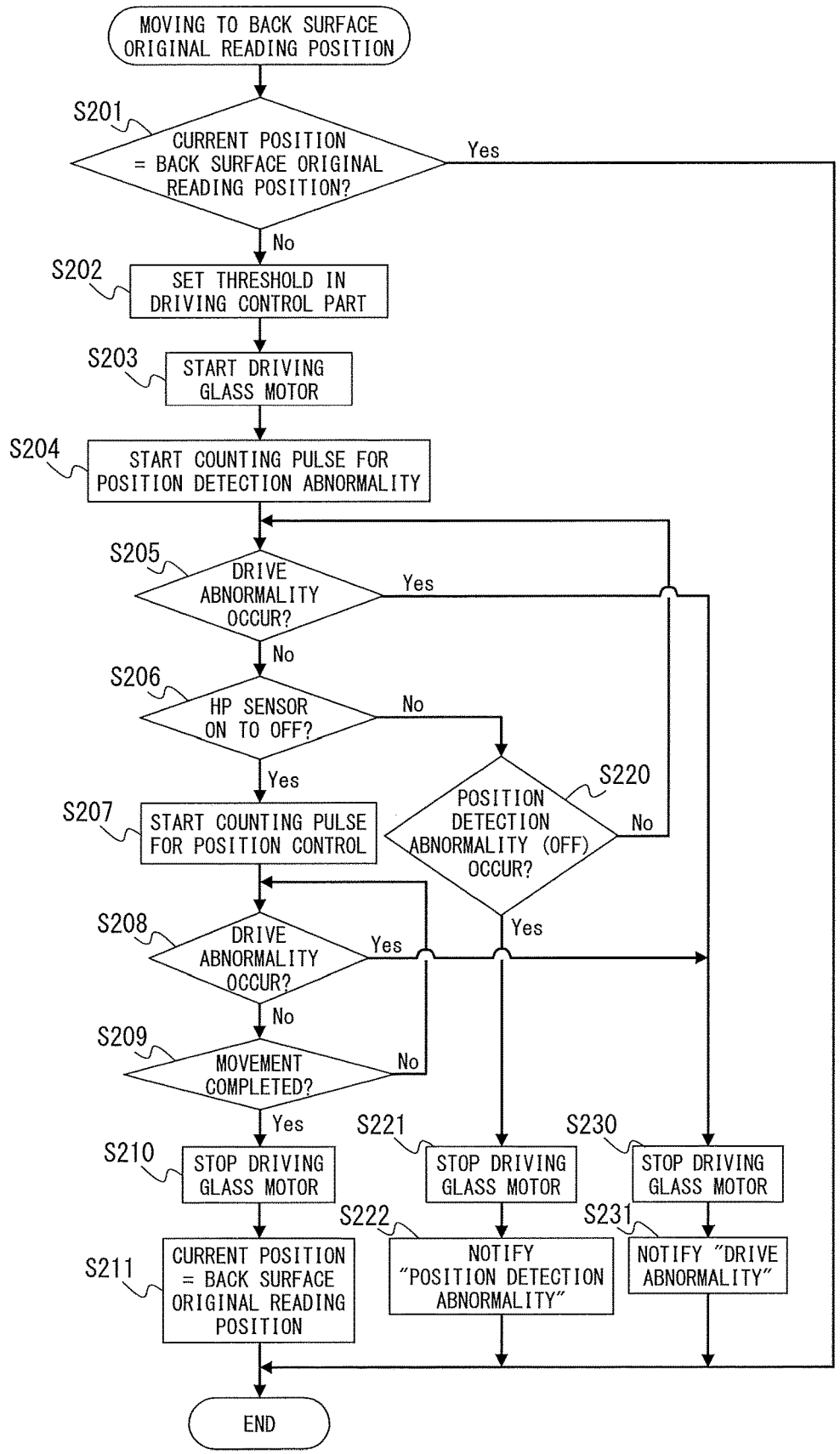
FIG. 8 is a flowchart showing an example of control in the movement of the back surface glass unit to a back surface original reading position.

As mentioned, in the both-surface original feeding reading, before the original reaches the back surface original feeding-reading position, the back surface glass unit 125 is moved to the back surface original reading position. FIG. 8 is a flowchart showing an example of control in the movement of the back surface glass unit 125 to the back surface original reading position. The CPU(A) 251 mainly performs each processing shown in FIG. 8. In the following, the control in the movement of the back surface glass unit 125 to the back surface original reading position is described using FIG. 8.

The CPU(A) 251 determines whether the current position of the back surface glass unit 125 is the back surface original reading position or not when moving the back surface glass unit 125 to the back surface original reading position (Step S201). The CPU(A) 251 reads the current position stored in the predetermined area of the RAM(A) 253. If it is determined that the current position is the back surface original reading position (Step S201: Yes), the CPU(A) 251 finishes the processing as the back surface glass unit 125 is already positioned at the back surface reading position and no movement is necessary. If it is determined that the current position is not the back surface original reading position (Step S201: No), or the current position stored is the position other than the back surface original reading position or the current position is not fixed as the position control is not performed yet, the CPU(A) 251 performs the movement control of the back surface glass unit 125 to the back surface original reading position.

The CPU(A) 251 sets the threshold Th for determining the overload of the glass motor 122 in the driving control part (Step S202). The CPU(A) 251 starts driving the glass motor 122 to start moving the back surface glass unit 125 (Step S203). The CPU(A) 251 starts counting the drive pulse of the glass motor 122 for the position detection abnormality detection (Step S204).

The CPU(A) 251 determines the presence/absence of the occurrence of the driving abnormality based on the overload detection signal which is output by the driving control part 123 (Step S205). In a case where the overload detection signal is ON or the overload is generated, the CPU(A) 251 determines that the driving abnormality occurs (Step S205: Yes) and stops driving the glass motor 122 (Step S230). The CPU(A) 251 transmits the abnormality occurrence notification of the driving abnormality to the CPU(B) 301 (Step S231) and finishes the processing. In a case where the overload detection signal is OFF or no overload is generated, the CPU(A) 251 determines that no driving abnormality occurs (Step S205: No) and confirms the output change of the glass HP sensor 111 (Step S206).

In a case where the output of the glass HP sensor 111 is not changed from ON to OFF (Step S206: No), the CPU(A) 251 determines the presence/absence of the occurrence of the position detection abnormality based on the count value for the position detection abnormality detection (Step S220). In a case where the count value is the pulse number C' which corresponds to the OFF reference moving amount L' or higher, the CPU(A) 251 determines that the position detection abnormality occurs as the output of the glass HP sensor 111 is not changed from ON to OFF even when the back surface glass unit 125 is moved by the OFF reference moving amount (Step S220: Yes). In this case, the CPU(A) 251 stops driving the glass motor 122 (Step S221). The CPU(A) 251 transmits the abnormality occurrence notification of the position detection abnormality to the CPU(B) 301 (Step S222) and finishes the processing. In a case where the count value is below the pulse number C', the CPU(A) 251 determines that no position detection abnormality occurs (Step S220: No) and shifts to the processing of the step S205 to perform the detection of the driving abnormality again.

In a case where the output of the glass HP sensor 111 is changed from ON to OFF (Step S206: Yes), the CPU(A) 251 starts counting a drive pulse of the glass motor 122 for the position control (Step S207). The CPU(A) 251 determines the presence/absence of the occurrence of the driving abnormality by the processing similar to that of the step S205 (Step S208). If it is determined that the driving abnormality occurs (Step S208: Yes), the CPU(A) 251 performs the processing similar to that of the step S205, in case of Yes (Step S230 through Step S231) and thereafter, finishes the processing.

If it is determined that no driving abnormality occurs (Step S208: No), the CPU(A) 251 determines whether the movement of the back surface glass unit 125 is completed or not based on the count value for the position control (Step S209). In a case where the count value does not match the pulse number C2 which corresponds to the moving amount Ld, the CPU(A) 251 determines that the movement of the back surface glass unit 125 to the back surface original reading position is not completed (Step S209: No) and shifts to the processing of the step S208 to perform the detection of the driving abnormality again. In a case where the count value matches the pulse number C2, the CPU(A) 251 determines that the movement of the back surface glass unit 125 to the back surface original reading position is completed (Step S209: Yes) and stops driving the glass motor 122 (Step S210). The CPU(A) 251 updates the current position stored in the predetermined area of the RAM(A) 253 to the back surface original reading position (Step S211) and finishes the processing.

In the image reading apparatus according to the present embodiment, when moving the back surface glass unit 125 by driving the glass motor 122, it is possible to determine the presence/absence of the occurrence of the driving abnormality and the position detection abnormality without the drive force larger than that required when normally driving the motor.

Second Embodiment

In the following, a second embodiment is explained. It is noted that the configuration of the image reading apparatus according to the present embodiment is similar to that of the reading apparatus according to the first embodiment so that the description is omitted.

<Cause of Driving Abnormality>

Possible causes of the driving abnormality (overload) detected by the driving abnormality detection as mentioned include a permanent cause such as damage in a back surface glass moving component and a temporary cause such as dust adhered to the back surface glass moving component. In a case where the driving abnormality is caused by the permanent cause, some countermeasure including fixing or replacing the component causing the driving abnormality needs to be taken. Once the driving abnormality occurs, the driving abnormality repeatedly occurs until some countermeasure is taken.

On the other hand, in a case where the driving abnormality is caused by the temporary cause, the driving abnormality state is sometimes solved (the driving abnormality no longer occurs) without taking any special countermeasure. For example, even when the driving abnormality occurs due to a heavier load than usual due to dust adhered to the back surface glass moving component, in a case where the dust adhered to the component falls afterward, the driving abnormality no longer occurs. Further, even when the dust remains adhered to the component, in a case where the load applied to the glass motor 122 is decreased by reducing the moving speed of the back surface glass when it moves, in some cases, the movement of the back surface glass can be completed without the occurrence of the driving abnormality.

<Retry Processing when Driving Abnormality Occurs>

When the driving abnormality occurs, in a case where the driving abnormality is caused by the permanent cause, it is necessary to notify the user of the occurrence of the abnormality to urge to take some countermeasure. On the other hand, in a case where the driving abnormality is caused by the temporary cause, if the driving abnormality is solved without notifying the user of the occurrence of the abnormality or the movement can be completed without the occurrence of the driving abnormality, user's convenience improves. In the following, a configuration example of notifying and not notifying the user of the occurrence of the driving abnormality is explained. In particular, when the driving abnormality occurs, if it is a first occurrence of the driving abnormality, the occurrence of the abnormality is not notified to the user. Instead, the movement of the back surface glass is attempted again by reducing the moving speed. As a result, if the driving abnormality occurs again, the occurrence of the abnormality is notified to the user. In a case where the driving abnormality does not occur, the occurrence of the abnormality is not notified to the user.

<Movement to Back Surface Shading Position>

Figure 9:
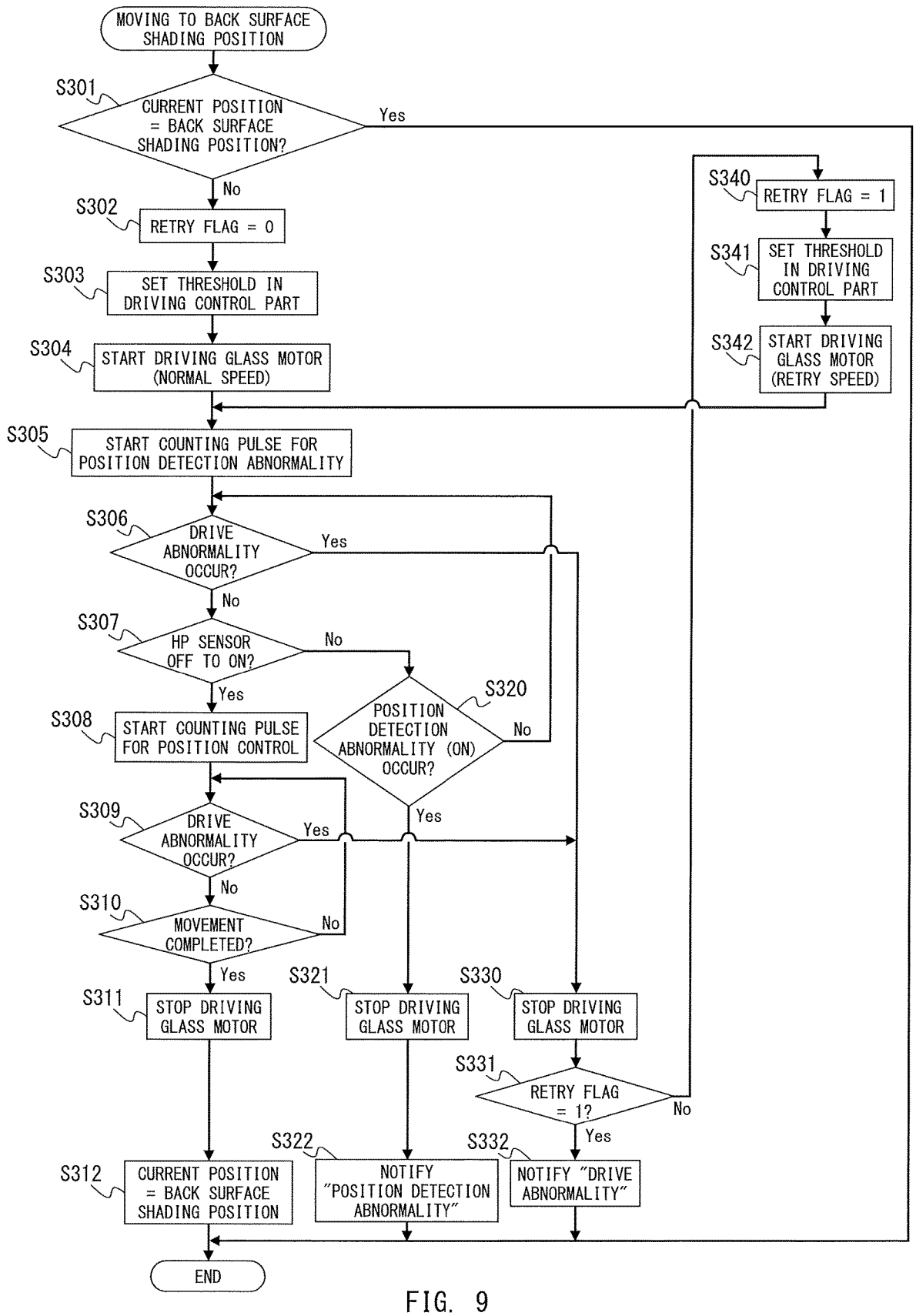
FIG. 9 is a flowchart showing an example of control in the movement of the back surface glass unit to the back surface shading position.

As mentioned, the back surface shading white board 110 is read by the back surface reading unit 102 to generate the white level reference data for the back surface reading before reading the original. Thereby, the back surface glass unit 125 is moved to the back surface shading position. FIG. 9 is a flowchart showing an example of control in the movement of the back surface glass unit 125 to the back surface shading position. The CPU(A) 251 mainly executes each processing shown in FIG. 9. In the following, the control in the movement of the back surface glass unit 125 to the back surface shading position is described using FIG. 9.

The CPU(A) 251 determines whether the current position of the back surface glass unit 125 is the back surface shading position or not when moving the back surface glass unit 125 to the back surface shading position (S301). It is noted that when the CPU(A) 251 performs the movement control of the back surface glass unit 125, the CPU(A) 251 stores the position of the back surface glass unit 125 after the movement control in the predetermined area of the RAM(A) 253 as the current position.

If it is determined that the current position stored in the predetermined area is the back surface shading position (Step S301: Yes), the CPU(A) 251 finishes the processing as the back surface glass unit 125 is already positioned at the back surface shading position and no movement is necessary.

If it is determined that the current position is not the back surface shading position (Step S301: No), the CPU(A) 251 performs the movement control of the back surface glass unit 125 to the back surface shading position. In particular, in a case where the current position stored is the position other than the back surface shading position or the current position is not fixed as the position control is not performed yet, the CPU(A) 251 performs the movement control of the back surface glass unit 125 to the back surface shading position.

The CPU(A) 251 sets an initial value 0 to a retry flag (Step S302). The CPU(A) 251 sets the threshold Th for determining the overload of the glass motor 122 in the driving control part (Step S303). The CPU(A) 251 starts driving the glass motor 122 to start moving the back surface glass unit 125 (Step S304). It is noted that a driving speed of the glass motor 122 at this time is a normal speed. The CPU(A) 251 starts counting the drive pulse of the glass motor 122 for the position detection abnormality detection (Step S305).

The CPU(A) 251 determines the presence/absence of the occurrence of the driving abnormality based on the overload detection signal which is output by the driving control part 123 (Step S306). In a case where the overload detection signal is ON or the overload is generated, the CPU(A) 251 determines that the driving abnormality occurs (Step S306: Yes) and stops driving the glass motor 122 (Step S330).

The CPU(A) 251 obtains a value of the retry flag (Step S331). In a case where the retry flag is 0 (Step S331: No), or if it is a first occurrence of the driving abnormality, the CPU(A) 251 reduces the speed and resumes the movement of the back surface glass or performs a retry. The CPU(A) 251 sets 1 to the retry flag (Step S340). The CPU(A) 251 sets the threshold Th for determining the overload of the glass motor 122 in the driving control part by the processing similar to that of the step S303 (Step S341). The CPU(A) 251 starts driving the glass motor 122 to start moving the back surface glass unit 125 (Step S342). It is noted that, as the driving speed of the glass motor 122 at this time, a retry speed is used. The retry speed is different from the normal speed at the step S304. It is noted that the retry speed is a speed relatively slower than the normal speed.

In a case where the retry flag is 1 (Step S331: Yes), or the driving abnormality occurs in the retry and it is a second occurrence of the driving abnormality, the CPU(A) 251 transmits the abnormality occurrence notification of the driving abnormality to the CPU(B) 301 (Step S332) and finishes the processing. In a case where the overload detection signal is OFF or no overload is generated in the processing of the step S306, the CPU(A) 251 determines that no driving abnormality occurs (Step S306: No) and confirms the output change of the glass HP sensor 111 (Step S307).

In a case where the output of the glass HP sensor 111 is not changed from OFF to ON (Step S307: No), the CPU(A) 251 determines the presence/absence of the occurrence of the position detection abnormality based on the count value for the position detection abnormality detection (Step S320). In a case where the count value is the pulse number C' which corresponds to the ON reference moving amount L' or higher, the CPU(A) 251 determines that the position detection abnormality occurs as the output of the glass HP sensor 111 is not changed from OFF to ON even when the back surface glass unit 125 is moved by the ON reference moving amount (Step S320: Yes). In this case, the CPU(A) 251 stops driving the glass motor 122 (Step S321). The CPU(A) 251 transmits the abnormality occurrence notification of the position detection abnormality to the CPU(B) 301 (Step S322) and finishes the processing. In a case where the count value is below the pulse number C', the CPU(A) 251 determines that no position detection abnormality occurs (Step S320: No) and shifts to the processing of the step S306 to perform the detection of the driving abnormality again.

In a case where the output of the glass HP sensor 111 is changed from OFF to ON (Step S307: Yes), the CPU(A) 251 starts counting the drive pulse of the glass motor 122 for the position control (Step S308). The CPU(A) 251 determines the presence/absence of the occurrence of the driving abnormality by the processing similar to the processing of the step S306 (Step S309). If it is determined that the driving abnormality occurs (Step S309: Yes), the CPU(A) 251 performs the processing similar to that of the step S306, in case of Yes (Step after Step S330). If it is determined that no driving abnormality occurs (Step S309: No), the CPU(A) 251 determines whether the movement of the back surface glass unit 125 is completed or not based on the count value for the position control (Step S310). In a case where the count value does not match the pulse number C1 which corresponds to the moving amount Lb, the CPU(A) 251 determines that the movement of the back surface glass unit 125 to the back surface shading position is not completed (Step S310: No) and shifts to the processing of the step S309 to perform the detection of the driving abnormality again.

In a case where the count value matches the pulse number C1, the CPU(A) 251 determines that the movement of the back surface glass unit 125 to the back surface shading position is completed (Step S310: Yes) and stops driving the glass motor 122 (Step S311). The CPU(A) 251 updates the current position stored in the predetermined area of the RAM(A) 253 to the back surface shading position (Step S312) and finishes the processing.

<Movement to the Back Surface Original Reading Position>

Figure 10:
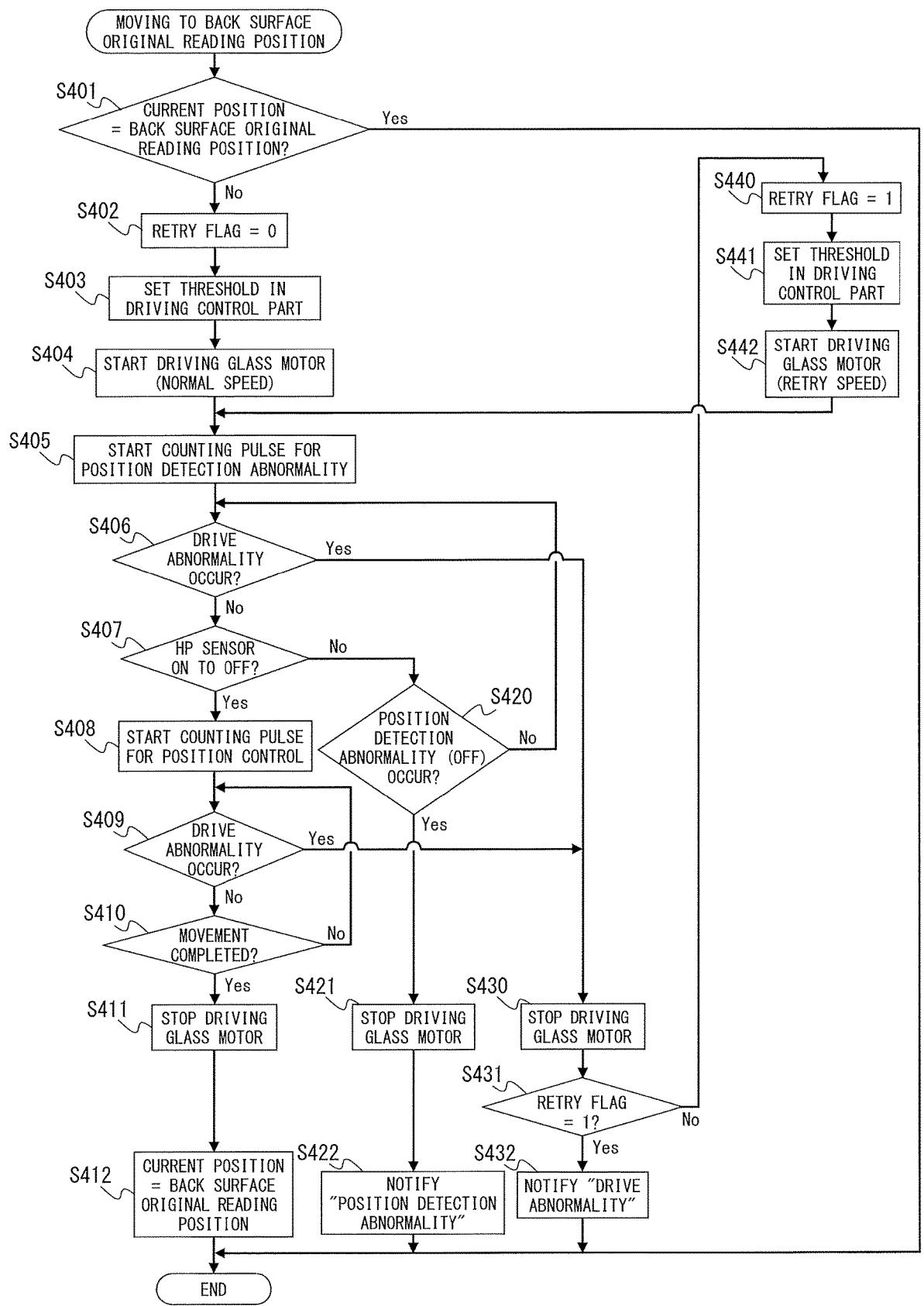
FIG. 10 is a flowchart showing an example of control in the movement of the back surface glass unit moves to the back surface original reading position.

As mentioned, in the both-surface original feeding reading, before the original reaches the back surface original feeding-reading position, the back surface glass unit 125 is moved to the back surface original reading position. FIG. 10 is a flowchart showing an example of control in the movement of the back surface glass unit 125 to the back surface original reading position. The CPU(A) 251 mainly executes each processing shown in FIG. 10. In the following, the control in the movement of the back surface glass unit 125 to the back surface original reading position is described using FIG. 10.

The CPU(A) 251 determines whether the current position of the back surface glass unit 125 is the back surface original reading position or not when moving the back surface glass unit 125 to the back surface original reading position (Step S401). The CPU(A) 251 confirms the current position stored in the predetermined area of the RAM(A) 253. In a case where the current position is the back surface original reading position (Step S401: Yes), the CPU(A) 251 finishes the processing as the back surface glass unit 125 is already positioned at the back surface original reading position and no movement is necessary. If it is determined that the current position is not the back surface original reading position (Step S401: No), or the current position stored is the position other than the back surface original reading position or the current position is not fixed as the position control is not performed yet, the CPU(A) 251 performs the movement control of the back surface glass unit 125 to the back surface original reading position.

The CPU(A) 251 sets the initial value 0 to the retry flag (Step S402). The CPU(A) 251 sets the threshold Th for determining the overload of the glass motor 122 in the driving control part (Step S403). The CPU(A) 251 starts driving the glass motor 122 to start moving the back surface glass unit 125 (Step S404). It is noted that the driving speed of the glass motor 122 at this time is the normal speed. The CPU(A) 251 starts counting a drive pulse of the glass motor 122 for the position detection abnormality detection (Step S405).

The CPU(A) 251 determines the presence/absence of the occurrence of the driving abnormality based on the overload detection signal which is output by the driving control part 123 (Step S406). In a case where the overload detection signal is ON or the overload is generated, the CPU(A) 251 determines that the driving abnormality occurs (Step S406: Yes) and stops driving the glass motor 122 (Step S430). The CPU(A) 251 obtains the value of the retry flag (Step S431).

In a case where the retry flag is 0 (Step S431: No), or if it is the first occurrence of the driving abnormality, the CPU(A) 251 reduces the speed of the glass motor 122 and performs the retry of the movement of back surface glass. The CPU(A) 251 sets 1 to the retry flag (Step S440). The CPU(A) 251 sets the threshold Th for determining the overload of the glass motor 122 in the driving control part by the processing similar to that of the step S403 (Step S441). The CPU(A) 251 starts driving the glass motor 122 to start moving the back surface glass unit 125 (Step S442). It is noted that, as the driving speed of the glass motor 122 at this time, the retry speed is used. The retry speed is different from the normal speed at the step S404. The retry speed is the speed relatively slower than the normal speed.

In a case where the retry flag is 1 (Step S431: Yes), or the driving abnormality occurs in the retry and it is the second occurrence of the driving abnormality, the CPU(A) 251 transmits the abnormality occurrence notification of the driving abnormality to the CPU(B) 301 (Step S432) and finishes the processing. In a case where the overload detection signal is OFF or no overload is generated in the processing of the step S406, the CPU(A) 251 determines that no driving abnormality occurs (Step S406: No) and confirms the output change of the glass HP sensor 111 (Step S407).

In a case where the output of the glass HP sensor 111 is not changed from ON to OFF (Step S407: No), the CPU(A) 251 determines the presence/absence of the occurrence of the position detection abnormality based on the count value for the position detection abnormality detection (Step S420). In a case where the count value is the pulse number C' which corresponds to the OFF reference moving amount L' or higher, the CPU(A) 251 determines that the position detection abnormality occurs as the output of the glass HP sensor 111 is not changed from ON to OFF even when the back surface glass unit 125 is moved by the OFF reference moving amount (Step S420: Yes). In this case, the CPU(A) 251 stops driving the glass motor 122 (Step S421). The CPU(A) 251 transmits the abnormality occurrence notification of the position detection abnormality to the CPU(B) 301 (Step S422) and finishes the processing. In a case where the count value is below the pulse number C', the CPU(A) 251 determines that no position detection abnormality occurs (Step S420: No) and shifts to the processing of the step S406 to perform the detection of the driving abnormality again.

In a case where the output of the glass HP sensor 111 is changed from ON to OFF (Step S407: Yes), the CPU(A) 251 starts counting the drive pulse of the glass motor 122 for the position control (Step S408). The CPU(A) 251 determines the presence/absence of the occurrence of the driving abnormality by the processing similar to that of the step S406 (Step S409). If it is determined that the driving abnormality occurs (Step S409: Yes), the CPU(A) 251 performs the processing similar to that of the step S406, in case of Yes (Step after Step S430). If it is determined that no driving abnormality occurs (Step S409: No), the CPU(A) 251 determines whether the movement of the back surface glass unit 125 is completed or not based on the count value for the position control (Step S410). In a case where the count value does not match the pulse number C2 which corresponds to the moving amount Ld, the CPU(A) 251 determines that the movement of the back surface glass unit 125 to the back surface original reading position is not completed (Step S410: No) and shifts to the processing of the step S409 to perform the detection of the driving abnormality again.

In a case where the count value matches the pulse number C2, the CPU(A) 251 determines that the movement of the back surface glass unit 125 to the back surface original reading position is completed (Step S410: Yes) and stops driving the glass motor 122 (Step S411). The CPU(A) 251 updates the current position stored in the predetermined area of the RAM(A) 253 to the back surface original reading position (Step S412) and finishes the processing.

In the image reading apparatus according to the present embodiment, when moving the back surface glass unit 125 by driving the glass motor 122, it is possible to determine the presence/absence of the occurrence of the driving abnormality and the position detection abnormality without the drive force larger than that required when normally driving the motor. Further, in the image reading apparatus according to the present embodiment, by performing the retry by reducing the speed when the driving abnormality occurs and in a case where the movement can be completed by the retry, by not notifying the user of the occurrence of the driving abnormality, it is possible to improve the user's convenience at the time of the occurrence of the temporary driving abnormality.

Third Embodiment

Figure 11A:
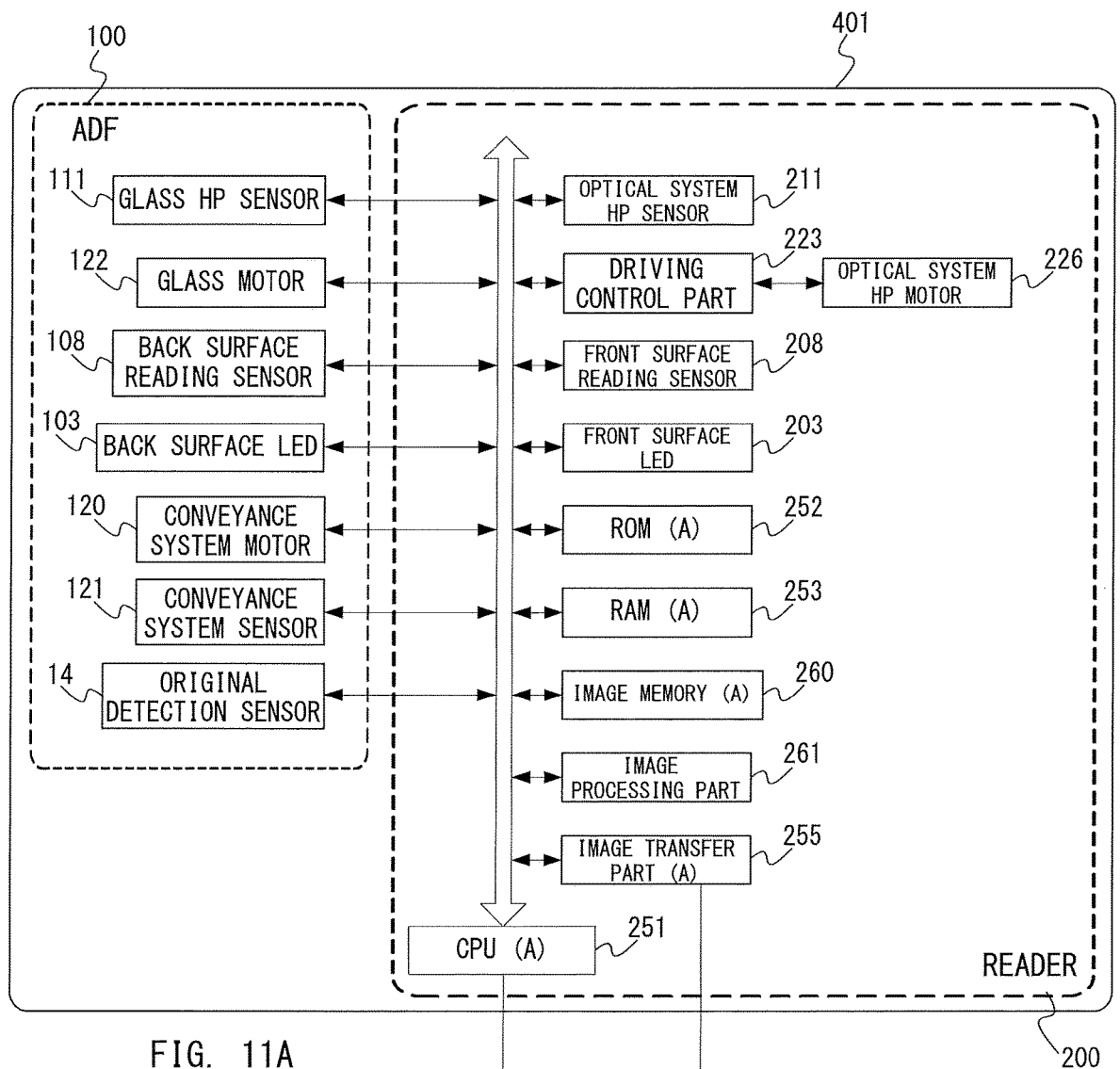
FIG. 11A and FIG. 11B are block diagrams each showing a configuration example of a control part included in an image reading apparatus according to a third embodiment.
Figure 11B:
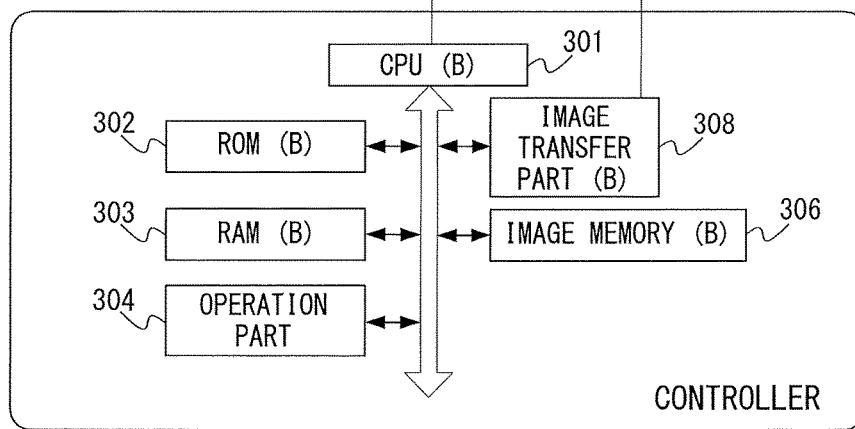
Figure 12A:
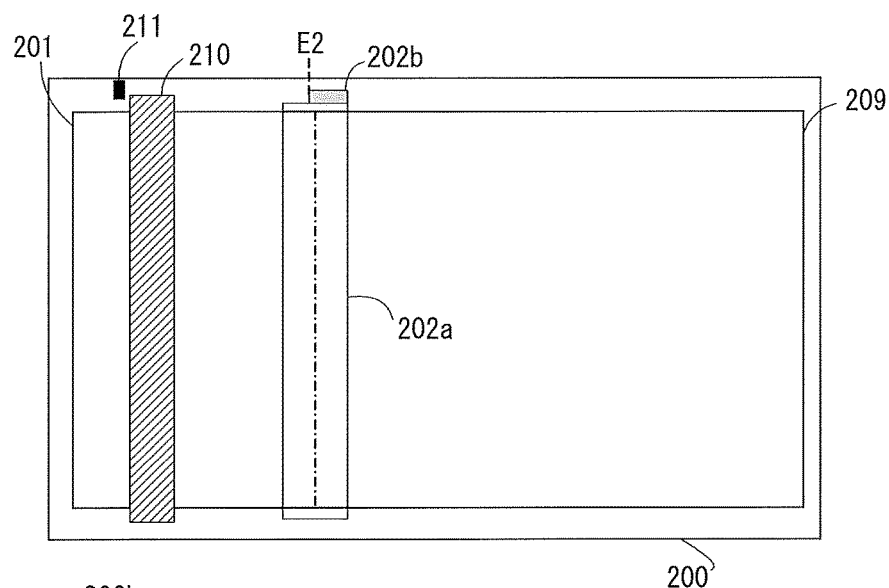
FIG. 12A, FIG. 12B, and FIG. 12C are plan views each showing a configuration example relating to a movement of a front surface reading unit.
Figure 12B:
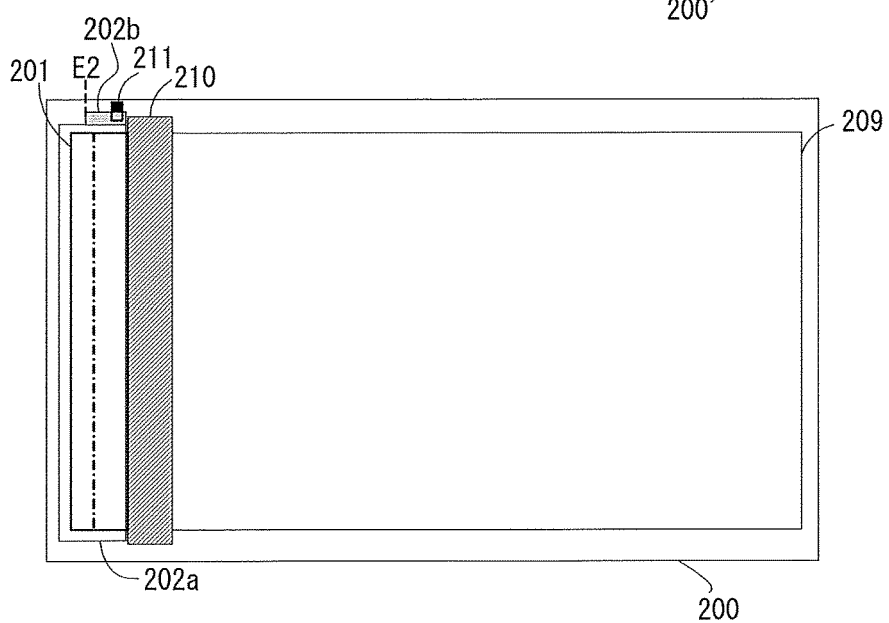
Figure 12C:
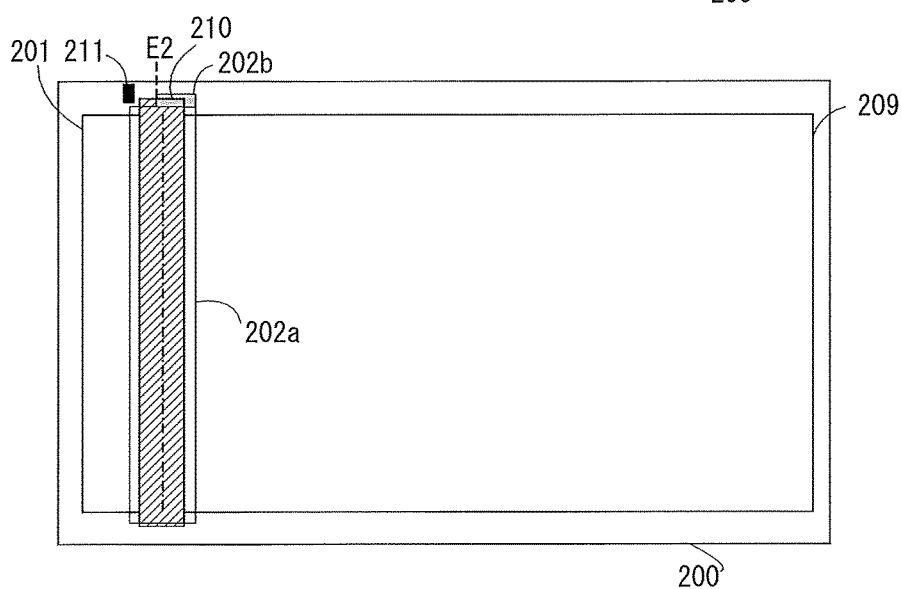

In the following, a third embodiment is explained. As for the configuration of the image reading apparatus according to the present embodiment, the same parts as those of the image reading apparatus according to the first embodiment and the second embodiment are denoted by the same symbols and the description is omitted.
<Description of Block Diagram>
FIG. 11A and FIG. 11B are block diagrams each showing a configuration example of a control part included in the image reading apparatus according to the present embodiment. FIG. 11A is a block diagram of the reader 200 and the ADF 100. FIG. 11B is a block diagram of the controller 300. In the following, parts which are different from the configuration of the image reading apparatus according to the first embodiment are mainly explained.
<Reader and ADF>
The CPU(A) 251 is respectively connected to the front surface LED 203, the front surface reading sensor 208, the back surface LED 103, the back surface reading sensor 108, the optical system motor 226 for moving the front surface reading unit 202 in the sub-scanning direction, and the optical system HP sensor 211. Also, the CPU(A) 251 is respectively connected to a driving control part 223 for controlling the drive of the optical system motor 226, the glass motor 122 for moving the back surface glass unit 125, the glass HP sensor 111, the image memory (A) 260, the image processing part 261, and the image transfer part (A) 255.
<Configuration of the Movement of the Front Surface Reading Unit>
FIG. 12A, FIG. 12B, and FIG. 12C are plan views each showing a configuration example relating to the movement of the front surface reading unit 202. In the following, the movement of the front surface reading unit is described using FIG. 12A through FIG. 12C. It is noted that each one-dot chain line in FIG. 12A through FIG. 12C shows the image reading target position of the front surface reading unit 202.

FIG. 12A shows a state where the front surface reading unit 202 is positioned below the original platen glass 209. The front surface reading unit 202 comprises a box 202a and a flag 202b which is attached to the box 202a. The box 202a mounts the front surface LED 203, a front surface mirror 204, an optical imaging lens (not shown), an optical component for reading an image constituted by the front surface reading sensor 208. By positioning the front surface reading unit 202 below the original platen glass 209, it is possible to read the image on the original placed on the original platen glass 209 by one line by the front surface reading unit 202 at a position indicated by the one-dot chain line.

FIG. 12B shows a state where the front surface reading unit 202 is positioned at the front surface original feeding-reading original reading position. When the front surface reading unit 202 is stopped at the front surface original feeding-reading original reading position, it is possible to read the image on the original which passes through on the front surface feeding reading glass 201 by one line through the front surface reading unit 202 at the position indicated by the one-dot chain line.

FIG. 12C shows a state where the front surface reading unit 202 is positioned at the front surface shading position. When the front surface reading unit 202 is stopped at the front surface shading position, it is possible to read the image on the front surface shading white board 210 by one line through the front surface reading unit 202 at the position indicated by the one-dot chain line.

As mentioned, in case of the fixed reading, the front surface reading unit 202 is moved in the sub-scanning direction indicated by the arrow in FIG. 1 at constant speed below the original platen glass 209. On the other hand, in case of the original feeding reading, the front surface reading unit 202 is stopped at the front surface original feeding-reading original reading position shown in FIG. 12B. Further, when shading, the front surface reading unit 202 is stopped at the front surface shading position shown in FIG. 12C. Further, after each operation such as the fixed reading, the original feeding reading and the like is completed, the front surface reading unit 202 is moved to a stand-by position (hereinafter, referred to as a home position) and stopped. In the present embodiment, the home position of the front surface reading unit 202 is the front surface shading position (FIG. 12C).

The movement of the front surface reading unit 202 to the respective positions is controlled as indicated below. The front surface reading unit 202 is configured to be movable in a right and left direction in FIG. 12A through FIG. 12C by driving the optical system motor 226 (not shown). For example, when the optical system motor 226 is driven to rotate normally, the front surface reading unit 202 moves in the right direction in FIG. 12A through FIG. 12C. When the optical system motor 226 is driven to rotate reversely, the front surface reading unit 202 moves in the left direction in FIG. 12A through FIG. 12C. Moreover, the optical system HP sensor 211 is disposed at the position shown in FIG. 12A through FIG. 12C. When the front surface reading unit 202 moves, the moving amount of the front surface reading unit 202 is controlled in accordance with the output change of the optical system HP sensor 211.

The optical system HP sensor 211 is a photo interrupter having, for example, a light emitting part and a light receiving part respectively on a front side and a deep side in FIG. 12A through FIG. 12C. When the front surface reading unit 202 moves, light from the light emitting part of the optical system HP sensor 211 is shielded or transmitted by the flag 202b of the front surface reading unit 202. Thereby, the output of the glass HP sensor 211 is changed to ON (when shielded) or OFF (when transmitted).

In the present embodiment, the optical system HP sensor 211 is disposed at the position shown in FIG. 12A through FIG. 12C. Thereby, when the front surface reading unit 202 is positioned below the original platen glass 209 or at the front surface shading position, the output of the optical system HP sensor 211 is OFF (FIG. 12A, FIG. 12C). Further, when the front surface reading unit 202 is positioned at the front surface original feeding-reading original reading position, the output of the optical system HP sensor 211 is ON (FIG. 12B). It is noted that the position detection of the front surface reading unit 202 using the optical system HP sensor 211 according to the present embodiment is similar to that of the back surface glass unit 125 using the glass HP sensor 111 in the first embodiment so that the description is omitted.

The front surface reading unit 202 is stopped after moving the front surface reading unit 202 by a predetermined distance from timing when the output of the optical HP sensor 211 is changed. Thus, it is possible to stop the front surface reading unit 202 at a desired position. As mentioned, the front surface reading unit 202 moves by driving the optical system motor 226. Thereby, it becomes possible to control the moving amount of the front surface reading unit 202 by counting a drive pulse of the optical system motor 226. Details of the moving amount control will be explained later.

<Drive Abnormality Detection>

The driving control part 223 is similarly configured to the configuration of the driving control part 123 in the first embodiment. Further, the driving control configuration and detection of the driving abnormality of the driving control part 223 are similar to those of the first embodiment except for how to determine the threshold so that the description is omitted. In designing the image reading apparatus 1000, a threshold Th is determined with a margin to a maximum load which is generated in the normal drive of the optical system motor 226. The CPU(A) 251 transmits the threshold Th to the driving control part 223 before driving the optical system motor 226.

<Moving Amount Control>

Figure 13A:
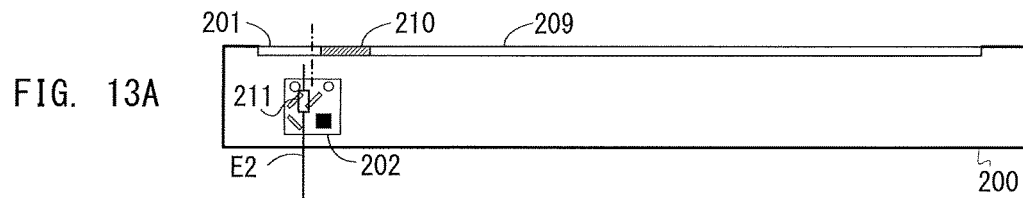
FIG. 13A, FIG. 13B, FIG. 13C, FIG. 13D, FIG. 13E, and FIG. 13F are sectional views for describing the movement of the front surface reading unit.
Figure 13B:
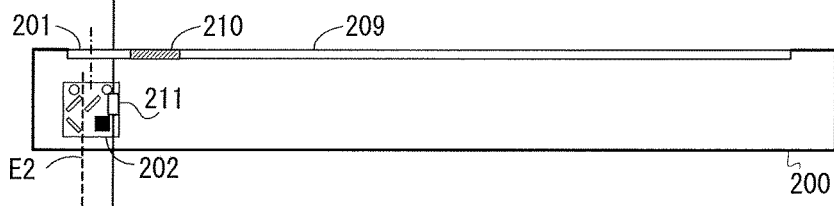
Figure 13C:
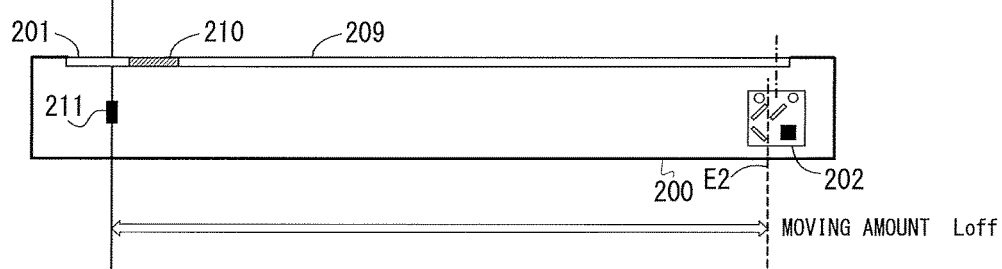
Figure 13D:
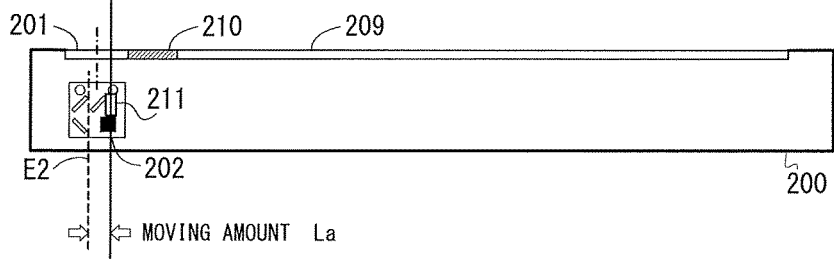
Figure 13E:
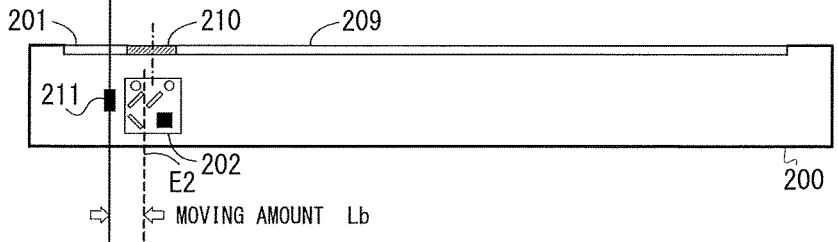

FIG. 13A through FIG. 13F are sectional views for describing the movement of the front surface reading unit 202. In the following, moving amount control in the movement of the front surface reading unit 202 is described using FIG. 13A through FIG. 13F. FIG. 13A shows a state where the front surface reading unit 202 is positioned at a position where the output of the optical system HP sensor 211 is switched (hereinafter, referred to as an output change point). FIG. 13B shows a state where the front surface reading unit 202 is positioned at a left end of its movable area. FIG. 13C shows a state where the front surface reading unit 202 is positioned at a right end of its movable area. FIG. 13D shows a state where the front surface reading unit 202 is positioned at the front surface original feeding-reading original reading position. FIG. 13E shows a state where the front surface reading unit 202 is positioned at the front surface shading position.

The left end position of the movable area of the front surface reading unit 202 shown in FIG. 13B is, for example, a position for physically fixing the front surface reading unit 202 by a tool which is not shown. For example, when the image reading apparatus 1000 is moved such as when the image reading apparatus 1000 is shipped, the left end position is used to physically fix the front surface reading unit 202 to prevent the image reading apparatus 1000 from being damaged due to the movement of the front surface reading unit 202. The right end position of the movable area of the front surface reading unit 202 shown in FIG. 13C is, for example, a position where the front surface reading unit 202 is stopped after reading the original of a maximum readable size by the fixed reading. As indicated by the dotted line and the void arrow between FIG. 13A and FIG. 13B, the moving amount of the front surface reading unit 202 from the state shown in FIG. 13A to the state shown in FIG. 13B is defined as a moving amount Lon. Further, moving amounts Loff, La and Lb show the moving amount of the front surface reading unit 202 indicated by the dotted line and the void arrow between each figure.

Figure 13F:

FIG. 13F is a diagram in which, using a left end E2 of the flag 202*b* indicated by the dotted line in FIG. 12A through FIG. 12C and FIG. 13A through FIG. 13E as a reference, the vertical axis represents the output of the optical HP sensor 211 and the horizontal axis represents the moving direction of the front surface reading unit 202. In particular, FIG. 13F shows the output change of the optical system HP sensor 211 in accordance with the movement of the front surface reading unit 202.

As mentioned, when the front surface reading unit 202 moves, the drive pulse of the glass motor 122 is counted in accordance with the output change of the optical system HP sensor 211. Then, in accordance with the count result, the control of the moving amount of the front surface reading unit 202 is performed. When moving the front surface reading unit 202 to an arbitrary position within its movable area, the control differs depending on whether or not the CPU(A) 251 grasps the current position of the front surface reading unit 202. In a case where the CPU(A) 251 grasps the current position, the control differs depending on whether the output of the optical system HP sensor 211 at the target position is different from that at the current position.

When the image reading apparatus 1000 is started, the movement control of the front surface reading unit 202 is never performed. Thereby, the CPU(A) 251 does not grasp the current position of the front surface reading unit 202. In this case, first, the front surface reading unit 202 is moved to the home position, which is referred to as HP returning. After the HP returning is performed, the CPU(A) 251 grasps the current position of the front surface reading unit 202 so that the CPU(A) 251 can move the front surface reading unit 202 to the target position in a manner which will be explained later.

In performing the HP returning, the CPU(A) 251 first moves the front surface reading unit 202 to the output change point (FIG. 13A) of the optical system HP sensor 211. Next, to move the front surface reading unit 202 to the front surface shading position, the CPU(A) 251 drives to normally rotate the optical system motor 226 and counts the drive pulse of the optical system motor 226 from that point. When the counted pulse number reaches the pulse number C2 which corresponds to the moving amount Lb which is a distance between the output change point and the front surface shading position, the CPU(A) 251 stops driving the optical system motor 226. The CPU(A) 251 stops the front surface reading unit 202 at the front surface shading position shown in FIG. 13E in this manner.

When the CPU(A) 251 grasps the current position of the front surface reading unit 202 and the output of the optical system HP sensor 211 at the target position matches the output of the optical system HP sensor 211 at the current position, the CPU(A) 251 moves the front surface reading unit 202 to the target position using the distance between the current position and the target position. For example, the CPU(A) 251 moves the front surface reading unit 202 from the right edge of the movable area shown in FIG. 13C (output of the optical system HP sensor 211: OFF) to the front surface shading position shown in FIG. 13E (output of the optical system HP sensor 211: OFF). In this case, the distance between the current position and the target position can be obtained by (moving amount Lb-moving amount Loff).

Then, the CPU(A) 251 drives to reversely rotate the optical system motor 226 and counts the drive pulse of the optical system motor 226 from when the drive is started. The CPU(A) 251 stops driving the optical system motor 226 at a point when the counted pulse number reaches an absolute value of a number obtained by decreasing a pulse number Coff which corresponds to the moving amount Loff from the pulse number C2 which corresponds to the moving amount Lb. The CPU(A) 251 stops the front surface reading unit 202 at the front surface shading position shown in FIG. 13E in this manner.

On the other hand, when the CPU(A) 251 grasps the current position of the front surface reading unit 202 and the output of the optical system HP sensor 211 at the target position differs from that at the current position, the CPU(A) 251 first moves the front surface reading unit 202 to the output change point of the optical system HP sensor 211. Thereafter, the CPU(A) 251 moves the front surface reading unit 202 to the target position using the distance between the output change point and the target position. For example, the CPU(A) 251 moves the front surface reading unit 202 from the front surface shading position shown in FIG. 13E (output of the optical system HP sensor 211: OFF) to the front surface original feeding-reading original reading position (output of the optical system HP sensor 211: ON). In this case, when the CPU(A) 251 drives to reversely rotate the optical system motor 226 to move the front surface reading unit 202 by the moving amount Lb in the left direction in FIG. 13A through FIG. 13F, the front surface reading unit 202 reaches the output change point of the optical system HP sensor 211 shown in FIG. 13A and the output of the optical system HP sensor 211 is changed from OFF to ON. The CPU(A) 251 counts the drive pulse of the optical system motor 226 from that point. When the counted pulse number reaches the pulse number C1 which corresponds to the moving amount La, the CPU(A) 251 stops the optical system motor 226. The CPU(A) 251 stops the front surface reading unit 202 at the front surface original feeding-reading original reading position shown in FIG. 13D in this manner.

<Detection of Position Detection Abnormality>

As mentioned, when the moving amount of the front surface reading unit 202 is controlled based on the output change of the optical system HP sensor 211, in a case where the output of the optical system HP sensor 211 is not changed for some reason, it is not possible to properly control the moving amount. Possible causes in this case include the driving abnormality and the position detection abnormality.

In case of the driving abnormality, if the optical system motor 226 steps out, the movement of the front surface reading unit 202 is prevented even when the optical system motor 226 is controlled to drive. Further, as the movement of the front surface reading unit 202 is prevented, the output of the optical system HP sensor 211 does not change. In case of the position detection abnormality, the optical system HP sensor 211 failures and the output is always ON or OFF so that even when the front surface reading unit 202 is moved to the position where, originally, the output changes (the output change point), the output will not change. The driving abnormality can be detected in the manner previously mentioned. The position detection abnormality is detected in a manner explained in the following.

Detection of the position detection abnormality in the movement of the front surface reading unit 202 is described using FIG. 13A through FIG. 13F. It is supposed that, when the output of the optical system HP sensor 211 is OFF when the movement of the front surface reading unit 202 is started, even when the front surface reading unit 202 is moved by the sufficient distance (ON reference moving amount), the output of the optical system HP sensor 211 is not changed from OFF to ON. In this case, it can be determined that the front surface reading unit 202 is in a state where the output of the optical system HP sensor 211 does not change. The sufficient distance in this case is, for example, a distance greater than the moving amount of the front surface reading unit 202 (Loff) which is from the right edge of its movable area from where the movement of the front surface reading unit 202 is started (FIG. 13C) to the position where the output of the optical system HP sensor 211 is turned to ON (FIG. 13A).

Further, similarly, it is supposed that, when the output of the optical system HP sensor 211 is ON when the movement of the front surface reading unit 202 is started, even when the front surface reading unit 202 is moved by the sufficient distance (OFF reference moving amount), the output of the optical system HP sensor 211 is not changed from ON to OFF. In this case, it can be determined that the front surface reading unit 202 is in a state where the output of the optical system HP sensor 211 does not change. The sufficient distance in this case is, for example, a distance greater than the moving amount of the front surface reading unit 202 (Lon) which is from the left edge of its movable area from where the movement of the front surface reading unit 202 is started (FIG. 13B) to the position where the output of the optical system HP sensor 211 is turned to OFF (FIG. 13A). In the present embodiment, as the ON reference moving amount, moving amount Loff is used. The moving amount Loff' is obtained by adding the margin $\alpha$ to the moving amount Loff ((Expression 2) shown below).

$$Loff'=Loff+\alpha \hspace{2cm} \text{(Expression 2)}$$

Further, as the OFF reference moving amount, a moving amount Lon' is used. The moving amount Lon' is obtained by adding the margin $\alpha$ to the moving amount Lon ((Expression 3) shown below).

$$Lon'=Lon+\alpha \hspace{2cm} \text{(Expression 3)}$$

It is supposed that the drive pulse of the optical system motor 226 from the start of the movement of the front surface reading unit 202 is counted and the output of the optical system HP sensor 211 when the movement is started is OFF (ON). Further, when the counted pulse number reaches a pulse number Coff' (Con') which corresponds to the moving amount Loff' (Lon'), the driving abnormality does not occur, and the output of the optical system HP sensor 211 is not changed to ON (OFF), it is determined that the position detection abnormality occurs.

<Control Example in the Present Embodiment>

FIG. 14, FIG. 15, FIG. 16, FIG. 17, and FIG. 18 are flowcharts each showing an example of control in the movement of the front surface reading unit 202. The CPU (A) 251 mainly executes each processing shown in each figure. In the following, the movement control of the front surface reading unit 202 is described using FIG. 14, FIG. 15, FIG. 16, FIG. 17, and FIG. 18.

<Movement Control>

Figure 14:
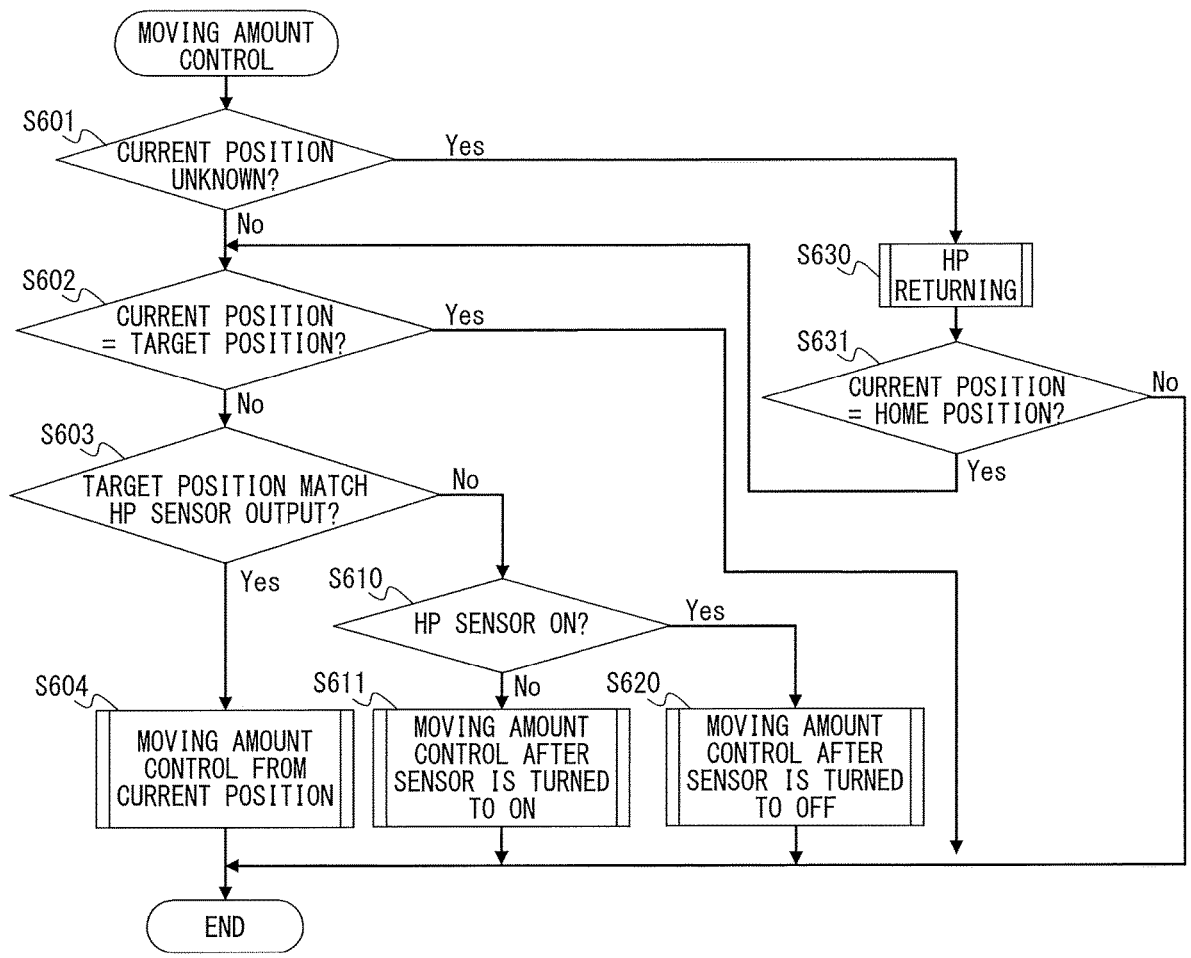
FIG. 14 is a flowchart showing an example of movement control of the front surface reading unit.

FIG. 14 is a flowchart showing an example of the movement control of the front surface reading unit 202. In the following, a control flow of the entire movement control is described using FIG. 14. When the CPU(A) 251 performs the movement control of the front surface reading unit 202, the CPU(A) 251 obtains the current position of the front surface reading unit 202 (Step S601). It is noted that the CPU(A) 251 stores the position of the front surface reading unit 202 after performing the movement control of the front surface reading unit 202 in the predetermined area of the RAM(A) 253 as the current position. Further, in the present embodiment, the position of the front surface reading unit 202 including the current position is managed by coordinates where the output change point of the optical system HP sensor 211 shown in FIG. 13A is used as an origin. The coordinates of the right side position in FIG. 13A through FIG. 13F with respect to the output change point of the optical system HP sensor 211 are positive. The coordinates of the left side position in FIG. 13A through FIG. 13F with respect to the output change point of the optical system HP sensor 211 are negative.

When the position control is not performed yet and the current position is unknown (Step S601: Yes), the CPU(A) 251 performs HP returning of the front surface reading unit 202 (Step S630). The control flow of the HP returning will be described later.

The CPU(A) 251 determines whether the front surface reading unit 202 is moved properly to the home position after the HP returning (Step S631). If it is determined that the current position matches the home position and the front surface reading unit 202 is moved properly to the home position (Step S631: Yes), the CPU(A) 251 shifts to the processing of the step S602. On the other hand, in a case where the driving abnormality or the position detection abnormality occurs during the HP returning, the front surface reading unit 202 is not moved to the home position and the current position does not match the home position. In this case (Step S631: No), the CPU(A) 251 finishes the processing (notification of the abnormality and the like are performed in the control flow of the HP returning which will be described later).

When the CPU(A) 251 shifts to the processing of the step S602, the CPU(A) 251 grasps the current position of the front surface reading unit 202. The CPU(A) 251 confirms whether the target position matches the current position or not (Step S602). In a case where the target position matches the current position (Step S602: Yes), the CPU(A) 251 finishes the processing as it is not necessary to move the front surface reading unit 202.

If it is determined that the current position does not match the target position (Step S602: No), the CPU(A) 251 controls to move the front surface reading unit 202 from the current position to the target position. If it is determined that the output of the optical system HP sensor 211 at the current position matches the output of the optical system HP sensor 211 at the target position (Step S603: Yes), the CPU(A) 251 moves the front surface reading unit 202 to the target position by performing the moving amount control from the current position (Step S604). The control flow in this case will be described later.

If it is determined that the output of the optical system HP sensor 211 at the current position does not match the output of the optical system HP sensor 211 at the target position (Step S603: No), the CPU(A) 251 moves the front surface reading unit 202 to the target position by performing the moving amount control from the output change point of the optical system HP sensor 211. In a case where the output of the HP sensor at the current position is OFF (Step S610: No), the CPU(A) 251 moves to a step S611 where the moving amount control after the output of the optical HP sensor 211 is turned to ON is performed. In a case where the output of the HP sensor at the current position is ON (Step S610: Yes), the CPU(A) 251 moves to a step S620 where the moving amount control after the output of the optical HP sensor 211 is turned to OFF is performed. Respective control flows will be described later.

<HP Returning>

Figure 15:
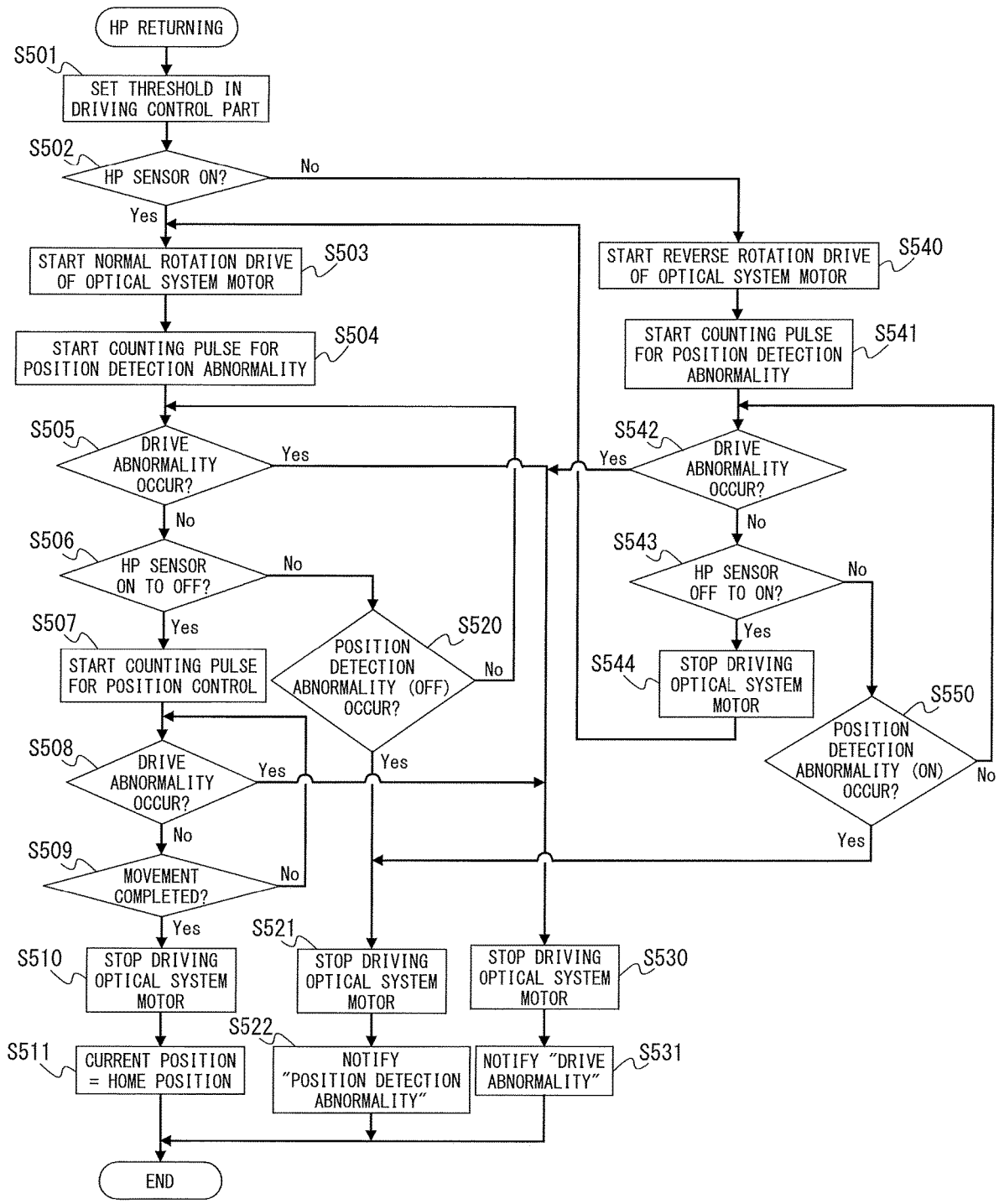
FIG. 15 is a flowchart showing an example of control in moving the front surface reading unit to a home position (HP returning).

As mentioned, when the image reading apparatus 1000 is started, the CPU(A) 251 does not grasp the current position of the front surface reading unit 202 so that the CPU(A) 251 performs the HP returning of the front surface reading unit 202 to grasp the current position of the front surface reading unit 202. FIG. 15 is a flowchart showing an example of control in the HP returning of the front surface reading unit 202. The control flow of the HP returning is described using FIG. 15.

The CPU(A) 251 sets the threshold Th for determining the overload of the front surface reading unit 202 in the driving control part (Step S501). The CPU(A) 251 obtains a current output of the optical system HP sensor 211 (Step S502). For example, in a case where the output of the current optical system HP sensor 211 is ON (Step S502: Yes), the front surface reading unit 202 is positioned to the left side in FIG. 13A through FIG. 13F with respect to the output change point (FIG. 13A) of the optical system HP sensor 211. Thereby, the output of the optical HP sensor 211 is changed from ON to OFF during the movement of the front surface reading unit 202 to the front surface shading position (FIG. 13E) which is the home position. The CPU(A) 251 moves the front surface reading unit 202 to the front surface shading position by the moving amount control from the point when the output of the optical system HP sensor 211 is changed from ON to OFF.

The CPU(A) 251 drives to normally rotate the optical system motor 226 to move the front surface reading unit 202 in the right direction in FIG. 13A through FIG. 13F (Step S503). The CPU(A) 251 starts counting the drive pulse of the optical system motor 226 for the position detection abnormality detection (Step S504). The CPU(A) 251 determines the presence/absence of the occurrence of the driving abnormality based on the overload detection signal which is output by the driving control part 223 (Step S505). In a case where the overload detection signal is ON or the overload is generated, the CPU(A) 251 determines that the driving abnormality occurs (Step S505: Yes) and stops driving the optical system motor 226 (Step S530). The CPU(A) 251 transmits the abnormality occurrence notification of the driving abnormality to the CPU(B) 301 (Step S531) and finishes the processing. In a case where the overload detection signal is OFF or no overload is generated, the CPU(A) 251 determines that no driving abnormality occurs (Step S505: No) and obtains the output of the optical system HP sensor 211 (Step S506).

In a case where the output of the optical system HP sensor 211 is not changed from ON to OFF (Step S506: No), the CPU(A) 251 determines the presence/absence of the occurrence of the position detection abnormality based on the count value for the position detection abnormality detection (Step S520). In a case where the count value is the pulse number Con' which corresponds to the OFF reference moving amount Lon' or higher, the CPU(A) 251 determines that the position detection abnormality occurs as the output of the optical system HP sensor 211 is not changed from ON to OFF even when the front surface reading unit 202 is moved by the OFF reference moving amount (Step S520: Yes). In this case, the CPU(A) 251 stops driving the optical system motor 226 (Step S521). The CPU(A) 251 transmits the abnormality occurrence notification of the position detection abnormality to the CPU(B) 301 (Step S522) and finishes the processing. In a case where the count value is below the pulse number Con', the CPU(A) 251 determines that no position detection abnormality occurs (Step S520: No) and shifts to the processing of the step S505 to perform the detection of the driving abnormality again.

In a case where the output of the optical system HP sensor 211 is changed from ON to OFF (Step S506: Yes), the CPU(A) 251 starts counting the drive pulse of the optical system motor 226 for the position control (Step S507). The CPU(A) 251 determines the presence/absence of the occurrence of the driving abnormality by the processing similar to the processing of the step S505 (Step S508). If it is determined that the driving abnormality occurs (Step S508: Yes), the CPU(A) 251 performs the processing similar to that of the step S505, in case of Yes (Step S530 through Step S531) and thereafter, finishes the processing. If it is determined that no driving abnormality occurs (Step S508: No), the CPU(A) 251 determines whether the movement of the front surface reading unit 202 is completed or not based on the count value for the position control (Step S509).

In a case where the count value does not match the pulse number C2 which corresponds to the moving amount Lb, the CPU(A) 251 determines that the movement of the front surface reading unit 202 to the home position (front surface shading position) is not completed (Step S509: No) and shifts to the processing of the step S508 to perform the detection of the driving abnormality again. In a case where the count value matches the pulse number C2, the CPU(A) 251 determines that the movement of the front surface reading unit 202 to the front surface shading position is completed (Step S509: Yes) and stops driving the optical system motor 226 (Step S510). The CPU(A) 251 updates the current position stored in the predetermined area of the RAM(A) 253 to the home position (front surface shading position) (Step S511) and finishes the processing.

On the other hand, in a case where the output of the optical system HP sensor 211 is OFF in the processing of the step S502 (Step S502: Yes), the front surface reading unit 202 is positioned to the right side in FIG. 13A through FIG. 13F with respect to the output change point (FIG. 13A) of the optical system HP sensor 211. However, as the current position (coordinates) is unknown, a moving distance of the front surface reading unit 202 to the front surface shading position (FIG. 13E) which is the home position or the moving direction is unknown. In this case, the CPU(A) 251 once moves the front surface reading unit 202 to the output change point of the optical HP sensor 211 (FIG. 13A).

Similar to the case where the output of the optical system HP sensor 211 is ON (Step S502: Yes), the CPU(A) 251 moves the front surface reading unit 202 to the front surface shading position by the moving amount control from the point when the output of the optical system HP sensor 211 is changed from ON to OFF. The CPU(A) 251 drives to reversely rotate the optical system motor 226 to move the front surface reading unit 202 in the left direction in FIG. 13A through FIG. 13F (Step S540). The CPU(A) 251 starts counting the drive pulse of the optical system motor 226 for the position detection abnormality detection (Step S541).

The CPU(A) 251 determines the presence/absence of the occurrence of the driving abnormality by the processing similar to that of the step S505 (Step S542). If it is determined that the driving abnormality occurs (Step S542: Yes), the CPU(A) 251 performs the processing similar to that of the step S505, in case of Yes (Step S530 through Step S531) and thereafter, finishes the processing. If it is determined that no overload is generated (Step S542: No), the CPU(A) 251 obtains the output of the optical system HP sensor 211 (Step S543).

In a case where the output of the optical system HP sensor 211 is not changed from OFF to ON (Step S543: No), the CPU(A) 251 determines the presence/absence of the occurrence of the position detection abnormality based on the count value for the position detection abnormality detection (Step S550). In a case where the count value is the pulse number Coff which corresponds to the ON reference moving amount Loff or higher, the CPU(A) 251 determines that the position detection abnormality occurs as the output of the optical system HP sensor 211 is not changed from OFF to ON even when the front surface reading unit 202 is moved by the ON reference moving amount (Step S550: Yes). In this case, the CPU(A) 251 performs the processing similar to that of the step S520, in case of Yes (Step S521 through Step S522) and thereafter, finishes the processing.

In a case where the count value is below the pulse number Con', the CPU(A) 251 determines that no position detection abnormality occurs (Step S550: No) and shifts to the processing of the step S542 to perform the detection of the driving abnormality again. In a case where the output of the optical system HP sensor 211 is changed from OFF to ON (Step S543: Yes), the CPU(A) 251 stops driving the optical system motor 226 (Step S544). Thereafter, the CPU(A) 251 shifts to the processing of the step S503.

<Moving Amount Control from the Current Position>

As mentioned, after the fixed reading is completed, the front surface reading unit 202 is stopped at the home position or the front surface shading position. After the fixed reading is completed, the front surface reading unit 202 is positioned where the output of the optical system HP sensor 211 is OFF. For example, after reading the original of the maximum readable size by the fixed reading, the front surface reading unit 202 is at the right end position of its movable area. The front surface reading unit 202 is moved from that position to the front surface shading position where the output of the optical system sensor 211 is OFF. In such a case, as the output of the optical system HP sensor 211 of the current position matches the output of the optical system HP sensor 211 of the target position, the front surface reading unit 202 is moved by the moving amount control from the current position.

Figure 16:
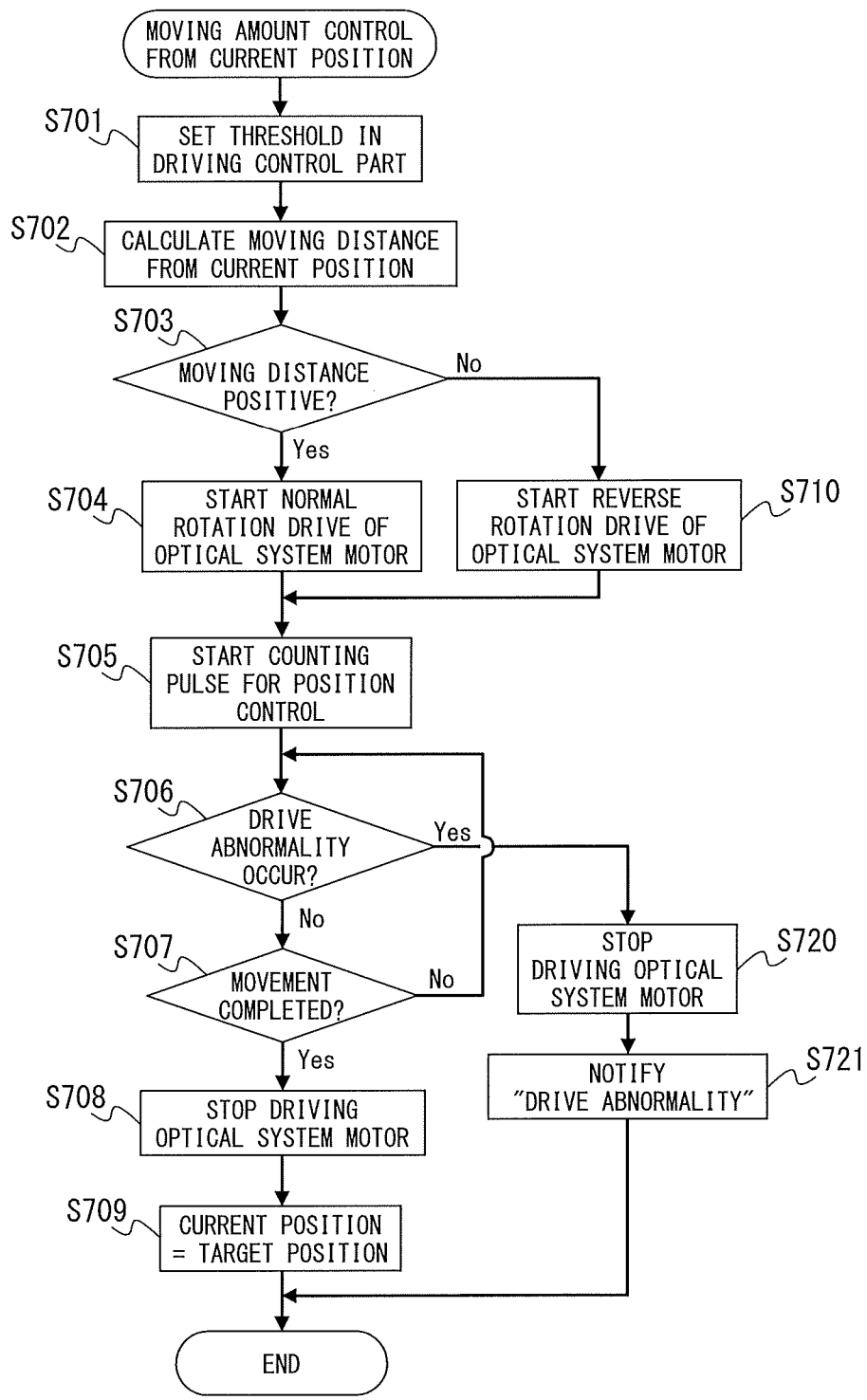
FIG. 16 is a flowchart showing an example of control in a moving amount control of the front surface reading unit from a current position.

FIG. 16 is a flowchart showing an example of control in the moving amount control of the front surface reading unit 220 from the current position. The CPU(A) 251 mainly executes each processing shown in FIG. 16. A control flow of the moving amount control from the current position is described using FIG. 16.

The CPU(A) 251 sets the threshold Th for determining the overload of the front surface reading unit 202 in the driving control part (Step S701). The CPU(A) 251 calculates a moving distance of the front surface reading unit 202 to move from the current position to the target position (Step S702). It is noted that the moving distance can be obtained by (x2−x1), where the coordinate of the current position is x1 and the coordinate of the target position is x2.

The CPU(A) 251 determines positive/negative of the calculated moving distance (Step S703). It is noted that if the moving distance (x2−x1) is positive, the target position is positioned to the right side in FIG. 13A through FIG. 13F with respect to the current position. In a case where the moving distance (x2−x1) is negative, the target position is positioned to the left side in FIG. 13A through FIG. 13F with respect to the current position.

If it is determined that the moving distance is positive (Step S703: Yes), the CPU(A) 251 drives to normally rotate the optical system motor 226 to move the front surface reading unit 202 in the right direction in FIG. 13A through FIG. 13. F (Step S704). If it is determined that the moving distance is negative (Step S703: No), the CPU(A) 251 drives to reversely rotate the optical system motor 226 to move the front surface reading unit 202 in the left direction in FIG. 13A through FIG. 13. F (Step S710). The CPU(A) 251 starts counting the drive pulse of the optical system motor 226 for the position control (Step S705).

The CPU(A) 251 determines the presence/absence of the occurrence of the driving abnormality based on the overload detection signal which is output by the driving control part 223 (Step S706). In a case where the overload detection signal is ON or the overload is generated, the CPU(A) 251 determines that the driving abnormality occurs (Step S706: Yes) and stops driving the optical system motor 226 (Step S720). The CPU(A) 251 transmits the abnormality occurrence notification of the driving abnormality to the CPU(B) 301 (Step S721) and finishes the processing. In a case where the overload detection signal is OFF or no overload is generated, the CPU(A) 251 determines that no driving abnormality occurs (Step S706: No) and determines whether the movement of the front surface reading unit 202 is completed or not based on the count value for the position control (Step S707).

In a case where the count value does not match a pulse number which corresponds to the moving distance (x2−x1), the CPU(A) 251 determines that the movement of the front surface reading unit 202 to the target position is not completed (Step S707: No) and shifts to the processing of the step S706 to perform the detection of the driving abnormality again. In a case where the count value matches the pulse number which corresponds to the moving distance (x2−x1), the CPU(A) 251 determines that the movement of the front surface reading unit 202 to the target position is completed (Step S707: Yes) and stops driving the optical system motor 226 (Step S708). The CPU(A) 251 updates the current position stored in the predetermined area of the RAM(A) 253 to the target position (Step S709) and finishes the processing.

<Moving Amount Control after the Sensor is Turned to ON>

As mentioned, before reading the original, the front surface shading white board 210 is read in a state where the front surface reading unit 202 is stopped at the front surface shading position to generate the white level reference data for the front surface reading. When performing the original feeding reading, the front surface reading unit 202 is moved from the front surface shading position (output of the optical system HP sensor 211: OFF) to the front surface original feeding-reading original reading position (output of the optical system HP sensor 211: ON). In such a case, the output of the optical system HP sensor 211 of the current position is different from that of the target position. The output of the optical system HP sensor 211 at the current position is OFF. Thereby, the front surface reading unit 202 is moved by the moving amount control after the output of the optical system HP sensor 211 is changed to ON.

Figure 17:
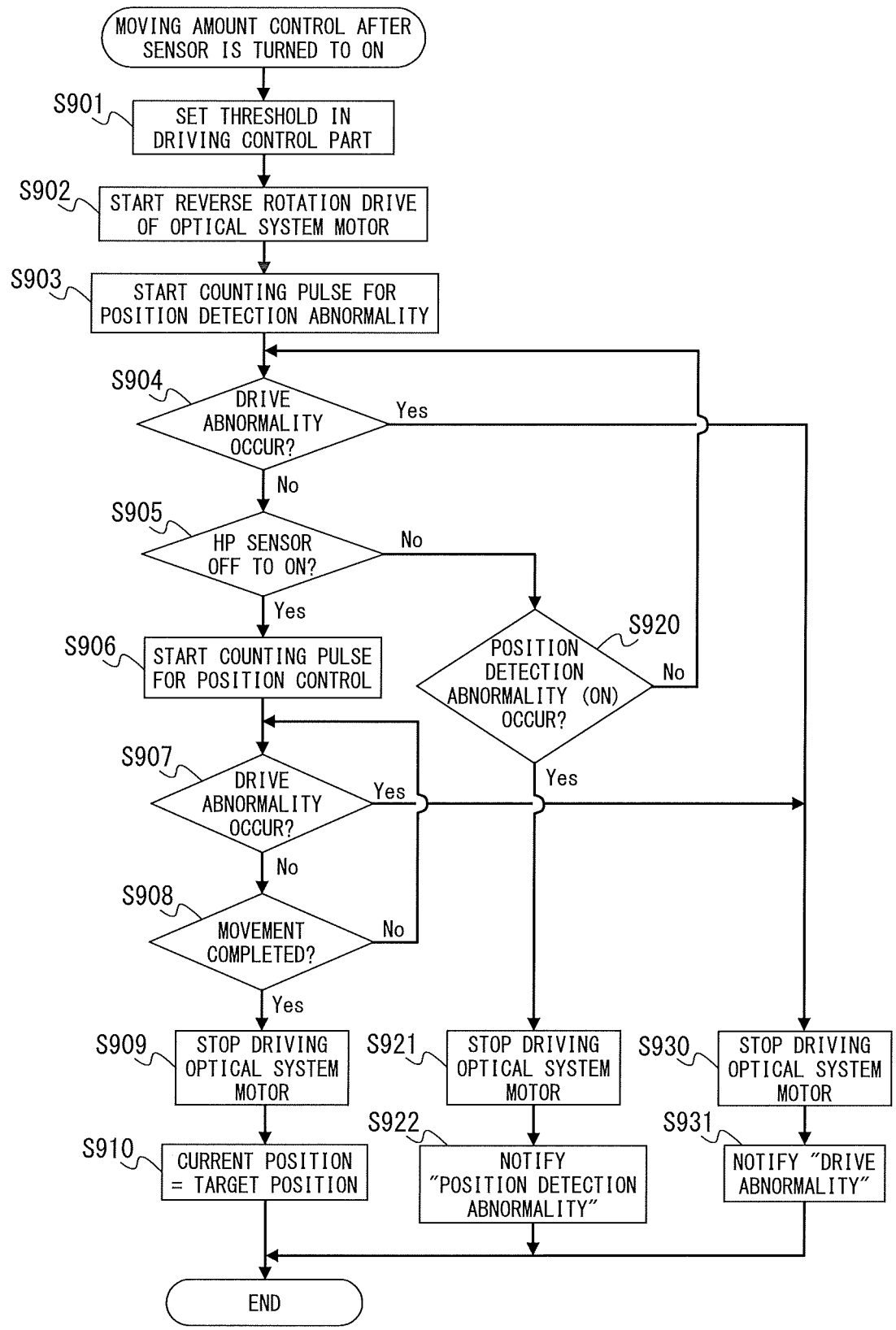

FIG. 17 is a flowchart showing an example of control in the moving amount control after the output of the optical system HP sensor 211 in the front surface reading unit 202 is changed to ON. The CPU(A) 251 mainly executes each processing shown in FIG. 17. A control flow of the moving amount control after the output of the optical system HP sensor 211 is changed to ON is described using FIG. 17.

The CPU(A) 251 sets the threshold Th for determining the overload of the front surface reading unit 202 in the driving control part (Step S901). The CPU(A) 251 drives to reversely rotate the optical system motor 226 to move the front surface reading unit 202 in the left direction in FIG. 13A through FIG. 13F (Step S902). The CPU(A) 251 starts counting the drive pulse of the optical system motor 226 for the position detection abnormality detection (Step S903).

The CPU(A) 251 determines the presence/absence of the occurrence of the driving abnormality based on the overload detection signal which is output by the driving control part 223 (Step S904). In a case where the overload detection signal is ON or the overload is generated, the CPU(A) 251 determines that the driving abnormality occurs (Step S904: Yes) and stops driving the optical system motor 226 (Step S930). The CPU(A) 251 transmits the abnormality occurrence notification of the driving abnormality to the CPU(B) 301 (Step S931) and finishes the processing. In a case where the overload detection signal is OFF or no overload is generated, the CPU(A) 251 determines that no driving abnormality occurs (Step S904: No) and obtains the output of the optical system HP sensor 211 (Step S905).

In a case where the output of the optical system HP sensor 211 is not changed from OFF to ON (Step S905: No), the CPU(A) 251 determines the presence/absence of the occurrence of the position detection abnormality based on the count value for the position detection abnormality detection (Step S920). In a case where the count value is the pulse number Coff or higher, the CPU(A) 251 determines that the position detection abnormality occurs as the output of the optical system HP sensor 211 is not changed from OFF to ON even when the front surface reading unit 202 is moved by the ON reference moving amount (Step S920: Yes). In this case, the CPU(A) 251 stops driving the optical system motor 226 (Step S921). The CPU(A) 251 transmits the abnormality occurrence notification of the position detection abnormality to the CPU(B) 301 (Step S922) and finishes the processing. In a case where the count value is below the pulse number Coff, the CPU(A) 251 determines that no position detection abnormality occurs (Step S920: No) and shifts to the processing of the step S904 to perform the detection of the driving abnormality again.

In a case where the output of the optical system HP sensor 211 is changed from OFF to ON (Step S905: Yes), the CPU(A) 251 starts counting the drive pulse of the optical system motor 226 (Step S906). The CPU(A) 251 determines the presence/absence of the occurrence of the driving abnormality by the processing similar to that of the step S904 (Step S907). If it is determined that the driving abnormality occurs (Step S907: Yes), the CPU(A) 251 performs the processing similar to that of the step S904, in case of Yes (Step S930 through Step S931) and thereafter, finishes the processing.

If it is determined that no driving abnormality occurs (Step S907: No), the CPU(A) 251 determines whether the movement of the front surface reading unit 202 is completed or not based on the count value for the position control (Step S908). In a case where the count value does not match a pulse number which corresponds to the moving distance from the output change point to the target position, the CPU(A) 251 determines that the movement of the front surface reading unit 202 to the target position is not completed (Step S908: No) and shifts to the processing of the step S907 to perform the detection of the driving abnormality again.

In a case where the count value matches the pulse number which corresponds to the moving distance from the output change point to the target position, the CPU(A) 251 determines that the movement of the front surface reading unit 202 to the target position is completed (Step S908: Yes) and stops driving the optical system motor 226 (Step S909). The CPU(A) 251 updates the current position stored in the predetermined area of the RAM(A) 253 to the target position (Step S910) and finishes the processing.

<Moving Amount Control after the Sensor is Turned to OFF>

As mentioned, after each operation is completed, the front surface reading unit 202 is moved at the front surface shading position which is the home position and stopped. When the original feeding reading is performed, the front surface reading unit 202 is moved from the front surface original feeding-reading original reading position (output of the optical system HP sensor 211: ON) to the front surface shading position (output of the optical system HP sensor 211: OFF). In such a case, the output of the optical system HP sensor 211 of the current position is different from that of the target position. The output of the optical system HP sensor 211 at the current position is ON. Thereby, the front surface reading unit 202 is moved by the moving amount control after the output of the optical system HP sensor 211 is changed to OFF.

Figure 18:
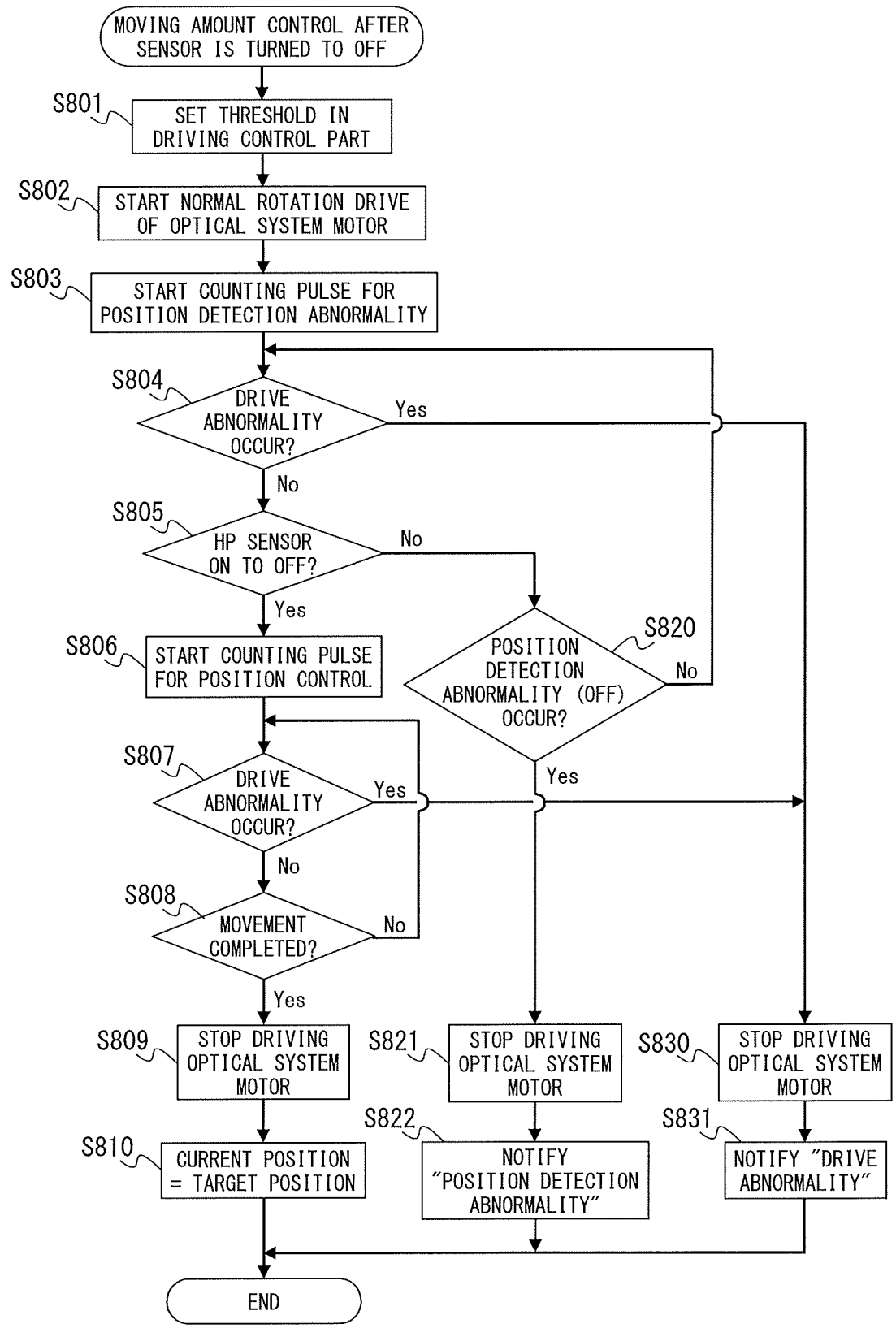
FIG. 18 is a flowchart showing an example of control in the moving amount control after the output of the optical system HP sensor in the front surface reading unit is changed to OFF.

FIG. 18 is a flowchart showing an example of control in the moving amount control after the output of an optical system HP sensor 211 in the front surface reading unit 202 is changed to OFF. The CPU(A) 251 mainly executes each processing shown in FIG. 18. A control flow of the moving amount control after the output of the optical system HP sensor 211 is changed to OFF is described using FIG. 18.

The CPU(A) 251 sets the threshold Th for determining the overload of the front surface reading unit 202 in the driving control part (Step S801). The CPU(A) 251 drives to normally rotate the optical system motor 226 to move the front surface reading unit 202 in the right direction in FIG. 13A through FIG. 13F (Step S802). The CPU(A) 251 starts counting the drive pulse of the optical system motor 226 for the position detection abnormality detection (Step S803).

The CPU(A) 251 determines the presence/absence of the occurrence of the driving abnormality based on the overload detection signal which is output by the driving control part 223 (Step S804). In a case where the overload detection signal is ON or the overload is generated, the CPU(A) 251 determines that the driving abnormality occurs (Step S804: Yes) and stops driving the optical system motor 226 (Step S830). The CPU(A) 251 transmits the abnormality occurrence notification of the driving abnormality to the CPU(B) 301 (Step S831) and finishes the processing. In a case where the overload detection signal is OFF or no overload is generated, the CPU(A) 251 determines that no driving abnormality occurs (Step S804: No) and obtains the output of the optical system HP sensor 211 (Step S805).

In a case where the output of the optical system HP sensor 211 is not changed from ON to OFF (Step S805: No), the CPU(A) 251 determines the presence/absence of the occurrence of the position detection abnormality based on the count value for the position detection abnormality detection (Step S820). In a case where the count value is the pulse number Con' or higher, the CPU(A) 251 determines that the position detection abnormality occurs as the output of the optical system HP sensor 211 is not changed from ON to OFF even when the front surface reading unit 202 is moved by the OFF reference moving amount (Step S820: Yes). In this case, the CPU(A) 251 stops driving the optical system motor 226 (Step S821). The CPU(A) 251 transmits the abnormality occurrence notification of the position detection abnormality to the CPU(B) 301 (Step S822) and finishes the processing. In a case where the count value is below the pulse number Coff, the CPU(A) 251 determines that no position detection abnormality occurs (Step S820: No) and shifts to the processing of the step S804 to perform the detection of the driving abnormality again.

In a case where the output of the optical system HP sensor 211 is changed from ON to OFF (Step S805: Yes), the CPU(A) 251 starts counting the drive pulse of the optical system motor 226 for the position control (Step S806). The CPU(A) 251 determines the presence/absence of the occurrence of the driving abnormality by the processing similar to the processing of the step S804 (Step S807). If it is determined that the driving abnormality occurs (Step S807: Yes), the CPU(A) 251 performs the processing similar to that of the step S804, in case of Yes (Step S830 through Step S831) and thereafter, finishes the processing. If it is determined that no driving abnormality occurs (Step S807: No), the CPU(A) 251 determines whether the movement of the front surface reading unit 202 is completed or not based on the count value for the position control (Step S808).

In a case where the count value does not match the pulse number which corresponds to the moving distance from the output change point to the target position, the CPU(A) 251 determines that the movement of the front surface reading unit 202 to the target position is not completed (Step S808: No) and shifts to the processing of the step S807 to perform the detection of the driving abnormality again. In a case where the count value matches the pulse number which corresponds to the moving distance from the output change point to the target position, the CPU(A) 251 determines that the movement of the front surface reading unit 202 to the target position is completed (Step S808: Yes) and stops driving the optical system motor 226 (Step S809). The CPU(A) 251 updates the current position stored in the predetermined area of the RAM(A) 253 to the target position (Step S810) and finishes the processing.

In the image reading apparatus according to the present embodiment, when moving the front surface reading unit 202 by driving the optical system motor 226, it is possible to determine the presence/absence of the occurrence of the driving abnormality and the position detection abnormality without the drive force larger than that required when normally driving the motor.

Further, the present disclosure can provide the driving device capable of determining whether, when the abnormality occurs in the driving device, the abnormality is the driving abnormality or the position detection abnormality without the drive force larger than that required when normally driving the device.

The above embodiments are only the examples to specifically explain the present invention. Therefore, the scope of the invention is not limited to these embodiments.

While the present invention has been described with reference to exemplary embodiments and it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-222735, filed Nov. 20, 2017 which is hereby incorporated by reference herein in its entirety.

What is claimed is:

1. An image reading apparatus comprising:
a movable moving unit;
a driving unit configured to move the moving unit, a driving abnormality detector configured to detect a driving abnormality of the driving unit;

a position sensor configured to detect whether the moving unit is at a predetermined position or not; and a controller configured to control operation of the driving unit to move the moving unit based on an output of the position sensor, wherein the controller is further configured to:

notify that the driving unit is abnormal in a case where the driving abnormality detector detects a driving abnormality while moving the moving unit; and notify that the position sensor is abnormal in a case where the position sensor did not detect that the moving unit is at the predetermined position though the moving unit is moved by a predetermined distance or more in a state where no abnormality is detected by the driving abnormality detector.

2. The image reading apparatus according to claim 1, wherein the driving abnormality detector is configured to detect presence/absence of occurrence of the driving abnormality by monitoring a load of the driving unit when the moving unit is moved.

3. The image reading apparatus according to claim 1, wherein the controller is configured to control to restart a movement of the moving unit again after the movement of the moving unit by the driving unit is stopped in a case where controller notified that the driving unit is abnormal.

4. The image reading apparatus according to claim 3, wherein the controller is configured to control drive of the driving unit so that a driving speed of the driving unit when the movement of the moving unit is restarted becomes relatively slower than a driving speed of the driving unit when the movement of the moving unit is stopped.

5. The image reading apparatus according to claim 1, wherein the moving unit is an opposed member which is disposed opposite to a reader in an image reading apparatus and comprises a reading glass and a reference white board, and wherein the reader is configured to read an original which moves on the reading glass or the reference white board by the movement of the moving unit.

6. The image reading apparatus according to claim 1, wherein the moving unit is a reader in an image reading apparatus and the moving unit reads the original by moving below an original platen.

7. The image reading apparatus according to claim 1, wherein the driving abnormality detector is further configured to detect whether a load of the driving unit exceeds a predetermined value or not.

* * * * *